(12) United States Patent
Lee

(10) Patent No.: US 9,278,304 B2
(45) Date of Patent: Mar. 8, 2016

(54) GAS ADSORBING AND SOUND ABSORBING COMPOSITE STRUCTURE OF ACTIVATED CHARCOAL-WOODEN MATERIAL COMPOSITES FOR IMPROVING INDOOR AIR QUALITY AND REMOVING RADON GAS, AND MANUFACTURING METHOD THEREOF

(71) Applicant: Hwa Hyoung Lee, Daejeon (KR)

(72) Inventor: Hwa Hyoung Lee, Daejeon (KR)

( * ) Notice: Subject to any disclaimer, the term of this patent is extended or adjusted under 35 U.S.C. 154(b) by 0 days.

(21) Appl. No.: 14/353,323

(22) PCT Filed: Oct. 22, 2012

(86) PCT No.: PCT/KR2012/008639
§ 371 (c)(1),
(2) Date: Apr. 22, 2014

(87) PCT Pub. No.: WO2013/062271
PCT Pub. Date: May 2, 2013

(65) Prior Publication Data
US 2014/0298997 A1    Oct. 9, 2014

(30) Foreign Application Priority Data

Oct. 27, 2011    (KR) ........................ 10-2011-0110831

(51) Int. Cl.
*B01D 53/04*    (2006.01)
*E04F 15/04*    (2006.01)
*B01J 20/20*    (2006.01)
*B32B 9/04*    (2006.01)
(Continued)

(52) U.S. Cl.
CPC ............ *B01D 53/0407* (2013.01); *B01D 53/72* (2013.01); *B01J 20/20* (2013.01); *B01J 20/28052* (2013.01); *B32B 9/04* (2013.01); *B32B 21/04* (2013.01); *B32B 37/10* (2013.01); *E04B 1/86* (2013.01); *E04F 13/10* (2013.01); *E04F 15/02161* (2013.01);
(Continued)

(58) Field of Classification Search
CPC ................. B01D 2253/102; B01D 2257/7027; B01D 2257/708; B01D 2258/06; B01D 2259/4508; B01D 53/0407; B01D 53/72; B01J 120/20; B01J 120/28052; B01J 2220/485
See application file for complete search history.

(56) References Cited

FOREIGN PATENT DOCUMENTS

JP    52-075020 X1    6/1977
JP    2002-137215 A   5/2002
(Continued)

OTHER PUBLICATIONS

International Search Report and Written Opinion received in PCT Application No. PCT/KR2012/008639 dated Oct. 22, 2012.

*Primary Examiner* — Christopher P Jones
(74) *Attorney, Agent, or Firm* — Steven B. Kelber

(57) ABSTRACT

This invention is about an activated charcoal-wooden composites or charcoal-wooden composites and its manufacturing method, which is composed of fancy natural veneered wooden material as a surface layer, activated charcoal board or charcoal board as a central layer and wooden material with round boring holes as a back layer, and especially, which contains both the lined grooves of the surface layer and the round boring holes perforated through the back layer, and also in the function, the activated charcoal-wooden composites or charcoal-wooden composites takes the hidden gas adsorbing room in one or above of each layer, through which many gases can be adsorbed into either one or both sides of the central layer, that is, the above hidden gas adsorbing room can not only adsorb radon gas which comes from the ground or wall of building itself, but also can simultaneously adsorb various harmful gases indoors.

9 Claims, 8 Drawing Sheets

(51) Int. Cl.
  *B32B 21/04*    (2006.01)
  *E04F 13/10*    (2006.01)
  *E04F 15/02*    (2006.01)
  *E04B 1/86*     (2006.01)
  *B01J 20/28*    (2006.01)
  *B01D 53/72*    (2006.01)
  *B32B 37/10*    (2006.01)
  *E04B 1/84*     (2006.01)
  *E04B 1/92*     (2006.01)

(52) U.S. Cl.
  CPC ........ *E04F 15/041* (2013.01); *B01D 2253/102* (2013.01); *B01D 2257/708* (2013.01); *B01D 2257/7027* (2013.01); *B01D 2258/06* (2013.01); *B01D 2259/4508* (2013.01); *B01J 2220/485* (2013.01); *E04B 1/92* (2013.01); *E04B 2001/848* (2013.01); *E04B 2001/849* (2013.01); *E04B 2001/8461* (2013.01); *E04F 2290/044* (2013.01)

(56) References Cited

FOREIGN PATENT DOCUMENTS

| | | |
|---|---|---|
| KR | 10-0572591 B1 | 4/2006 |
| KR | 10-0757316 B1 | 9/2007 |

GAS ADSORBING AND SOUND ABSORBING COMPOSITE STRUCTURE OF ACTIVATED CHARCOAL-WOODEN MATERIAL COMPOSITES FOR IMPROVING INDOOR AIR QUALITY AND REMOVING RADON GAS, AND MANUFACTURING METHOD THEREOF

BACKGROUND OF THE INVENTION

1. Field of the Invention

This application claims the prior right to the invention of Korean patent application number "10-2011-0110831" under the title of "Manufacturing method and gas adsorbing and sound absorbing structure of the fancy wood overlaid charcoal board wood composites for indoor air quality".

This invention is not only about the method of manufacturing the Charcoal-Wooden material Composites or the Activated Charcoal-Wooden material Composites (hereafter referred to as CW-Composites or ACW-Composites) made of wooden material laminated with the Charcoal Board (hereunder referred to as C-Board) or the Activated Charcoal Board (hereunder referred to as AC-Board) which is composed of the Surface Layer (hereunder referred to as S-Layer) of wooden material such as Fancy plywood, the Central Layer (hereafter referred to as C-Layer) of AC-Board or C-Board, the Back Layer (below referred to as B-Layer) of wooden material such as holes-perforated plywood, but also about "the gas adsorbing and sound absorbing Composite Structure" (below referred to as Com-Structure) which fulfills functions on adsorbing gases such as formaldehyde, Total Volatile Organic Compounds (below referred to as TVOC) etc. evaporated in the room of dwellings into the Surface of Indoor Side (hereunder referred to as IS-Surface) on AC-Board or C-Board as well as adsorbing the Gas of Radon radioactivity (below referred to as R-Gas) radiated out from the concrete wall itself or the ground beneath the building into the Surface of Wall Side (below referred to as WS-Surface) on AC-Board or C-Board through making up and setting the specified Gas Adsorbing composite Structure (below referred to as G-Adsorbing Structure) on both S-layer and B-Layer made of wooden material such as Fancy Natural Lumber (hereunder referred to as FN-Lumber), Fancy Veneer of Natural lumber (hereafter referred to as FN-Veneer), plywood, particle board, Glued Laminated Wood (below referred to as G-Laminated Wood), fiber board so as to give the full ability and property of Gas Adsorbing Function (below referred to as G-Adsorbing Function) to the both surface of AC-Board or C-Board which are placed in C-Layer of the above said CW-Composites or ACW-Composites.

In addition to the above presented description, if we consider that AC-Board or C-Board has the high qualified ability of Sound Absorbing Action (below referred to as S-Absorbing Action), this invention is also related with "the Activated Charcoal-Wooden material Composites made of the Thin Fancy Natural Veneer overlaid on the Activated Charcoal Board laminated with Wooden Material (below referred to as ACW-Composites of TFN-Veneer on AC-Board with W-Material)", which contains 'the Hidden Gas and Sound Sorbing Room (hereafter referred to as H-GS-Sorbing-Room) where both Gas and Sound Sorbing Action (hereunder referred to as GS-Sorbing Action) can be simultaneously generated, by the way, the higher quality of Gas and Sound Sorbing Function (below referred to as GS-Sorbing Function) originates from the structural shape, as it were, 'the shape of H-GS-Sorbing-Room joined with the straight Line type depressed Grooves (凵) of the Surface Layer (below referred to as Lined Grooves of S-Layer) can not only take out the space and square from Lined Grooves grooved up to half a depth of C-Board in both S-layer and C-layer, as well as from H-GS-Sorbing Room enlarged to be wider than the width of Lined Grooves of S-Layer, but also from adding 'Prominent and Sounds Reflecting Prism (Δ) built up on incident parts to which sounds enters through the straight Lined depressed Grooves (凵) of the Surface Layer' (below referred to as S-Reflecting Prism built up on the incident parts through Lined Grooves of S-Layer).

2. Description of the Related Art

Modern human beings live indoors during more than 90% of a day. If we see the WHO reports in 2002 2,400,000 persons lose their lives from air pollution every year, especially 1,500,000 men among them die of indoor air pollution, we can feel how much important the quality of indoor air is for human life.

We can stare at TVOC, formaldehyde, fine dust, R-Gas, etc. as important materials which pollute indoor air, and among them, we should fix our eye on TVOC, formaldehyde which many governments regulate to control the quality of air in the world. R-Gas, as a invisible, odorless and tasteless gas, can be one of the most dangerous gases, as lung cancers are caused by the α-particle emitted from R-Gas during a Half Period of a radioactive element (below referred to as H-Period) {Rn 222; 3.82 day and daughter nuclide, Po 218; 3 minutes, Porstendofer 1984}. Nowadays concrete or gypsum boards are adopted for most of interior materials in building constructions, accordingly Environmental Protective Agency (EPA) in USA and the Ministry of Environment in Korea recommend the concentration of R-Gas in indoor air to be less than 4 pCi/L. It was reported that 15~17 pCi/L of R-Gas was being emitted from gypsum boards, 30~34 pCi/L from asbestos slate, 8~10 pCi/L from wooden plates for cement, 15~18 pCi/L from closed cement pack by data of EPA, USA in 1986 (Test on Radon emitting volume among panel typed building materials based on Desiccator Method).

By the way, the charcoal or the activated charcoal has its own characteristic properties to purify and remove VOC or formaldehyde by adsorbing the gas, as well as to intercept electromagnetic waves or harmful radio waves, on the contrary, to radiate useful far infrared lights or anions, which results from the its own function of holding water, air ventilation, adsorbing gas and accumulating heat. Accordingly we can dare to say that because they have properties to adsorb the R-Gas which enters indoor rooms from interior materials of the concrete building or via wall cracks from the ground under the building over 4 times more than recommended volume, when there are not any other methods of removing R-Gas except ventilating facilities by this time, the CW-Composites or ACW-Composites is certainly one of the most human friendly materials as an Interior Material for Building (hereunder referred to as BI-Material) via changing the harmful R-Gas of 3.8 days' H-Period into the solid state for the block of internal radiation exposure, as it were, by 'adsorbing R-Gas into AC-Board or C-Board of C-Layer through G-Adsorbing Structure with Round Boring Holes (below referred to as RB-Holes) on WS-Surface of B-Layer'. Moreover, the said CW-Composites or ACW-Composites will really provide inhabitants with both the better health and the more comfortable environments by offering the multi-function on GS-Sorbing Action, because it has the highly qualified effects on the shown work due to the structural area and shape of both Lined grooves on S-layer and H-GS-Sorbing-Room accompanied with Lined Grooves to be wider than Lined Grooves on S-Layer beneath S-Layer at the interior parts of C-Board or AC-Board in C-layer which are linked with Lined Grooves on S-layer, thus resulting in acting as the 'Com-Structure, which has the excellent ability of adsorbing indoor polluted materials like formaldehyde, TVOC, etc. though the above said Lined Grooves into the IS-Surface of C-Board or AC-Board in C-layer as well as absorbing sounds originated from indoor room in dwellings through the above said Lined Grooves into the IS-Surface of C-Board or AC-Board in C-layer, and which shows remarkably the natural beauty of N-Lumber with beautiful design on the S-Layer from the indoor view'.

While C-Boards mainly made of carbon, have been made of various materials and by many kinds of methods until this time, I, the applicant, registered the method manufacturing CW-Composites or ACW-Composites applied to the Wall Finishing Material (hereunder referred to as WF-Material) in building construction under Patent No. 10-0572591 with the Korean Intellectual Property Office (KIPO), where I presented "The method manufacturing the Com-Structure of AC-Board or C-Board used for BI-Material, which got the excellent function on gas adsorption, water holding stability, far infrared lights radiating ratio and anions emitting rate" with detailed data of various physical and mechanical properties including gas adsorption. Besides, I developed 'the technology manufacturing C-Board only of the charcoal powder (hereunder referred to as C-Powder) and adhesives' without adding any fiber ingredients, and I improved 'The method making the beautiful looks better while uniting C-Board with other wooden material in order the strength to be reinforced', that is, I realized the method of overlaying pattern printed wallpaper or non-woven fabric on C-Board for the purpose of reforming the beauty of IS-Surface from the black color of C-Board while maintaining G-Adsorbing Function of C-Board (Patent No. 10-0667371, 2007). Moreover, I particularly reported that C-Board itself 10 mm thick had been continuously keeping G-Adsorbing Function at a rate of 87.9% compared with the initially measured value in the past 6 years at each measurement per year after being left alone with a gas of 20 ppm in a pot (2010).

For all that, although I had presented 'Siding Type', 'Louver Type' and 'Sliding Type' as several kinds of G-Adsorbing Structure composed of a Natural Lumber Panel (hereunder referred to as NL-Panel) as S-Layer seen from indoor side which was set before C-Board invisible from indoor side (Air ventilating window in human friendly Com-Structure used for residential buildings, which was made of C-Board & wooden material of different kind in Patent No. 0517139, 2005), I found out the necessity for improving the said structure because it was hard to install the fragile box filled with C-Board when there was a empty space between S-Layer and C-Board as a separated type. And I discovered a insufficient point in the method in Patent No 10-0572591, which symbolized 'the needs for improving the Com-Structure by both reinforcing the strength and changing the shape of structure under considering beautiful sense and manufacturing process, because I had given 'my consideration only to the adsorption of indoor gas, but not to the adsorption of R-Gas' which had come out from the inside wall of concrete itself or the outside ground of building by using general plywood without any air ventilating holes as a B-Layer, as well as because I stroke upon it was be able to sufficient to adsorb the R-Gas through Round Boring Holes formed (bored) less than 25% ratio to all the surface area on the Back Layer (hereunder referred to as RB-Holes below 25% on B-Layer), which was previously presented by me. Moreover, I detected 'the possibility to combine the manufacturing process into one lot' which had been divided into 2 steps; the one was the process to manufacture AC-Board or C-Board and the other was the process to stick both S-layer and B-Layer of wooden material to C-Layer of AC-Board or C-Board by heating pressed process. Besides the method of Patent No 10-0667371 applied by me, where pattern printed papers or non-woven fabrics are overlaid on AC-Board or C-Board, was required to grow an operating efficiency on works such as a nail driving work, drilling work, etc. as well as the transporting and handling work to make them easy because it is too weak to be used for WF-Material.

Until now the type of the Sound Absorbing composite Structure (hereunder referred to as S-Absorbing Structure) has been classified into 'Porous material type', 'Board Vibrating material type', or 'Resonating material type', and the Com-Structure mixed with more than one type among above shown 3 types has been normally put to use, because it has been known to the world until present time that the acoustic absorptivity was closely related with frequency, the properties and structure of wall making materials (Wooden Physics and Dynamics published in 1989). If we investigate Sound Absorbing Materials (below referred to S-Absorbing Materials) usually used in the market by this time, in the view of the outlooks and structure of materials, we can meet following products as the mainstream such as Medium Density Fiberboard (hereunder referred to as MDF Board or MDF), Insulation Fiberboard (hereunder referred to as IB or IF-Board), Insulation Fiberboard carried with Round Boring (perforated) Holes (below referred to as IF-Board with RB-Holes or Perforated IB), Medium Density Fiberboard carried with Round Boring (perforated) Holes (below referred to as MDF-Board with RB-Holes or Perforated MDF), Narrow Fancy Board (hereunder referred to as F-Board) arranged at regular intervals as a line type, or Fancy Veneer of natural wood overlaid on Medium Density Fiberboard (below referred to as F-Veneered MDF) which composed of Sound Absorbing Board (hereunder referred to as S-Absorbing Board) with Lined Grooves grooved up to a fixed depth from the surface and with RB-Holes perforated up to the opposite end of the remained depth on S-Absorbing Board to be put together in the line of Grooves like Topakustik® (Please refer to M-1 and M-3 of FIG. 6), and where as a surface finishing work for non-flammable function, either non-flammable sheets were pasted or non-flammable paints were coated on the above shown F-Veneered MDF. Besides, as other looks and processes, we can be faced with products where if decorating plywoods are adopted as a WF-Material, they contain grooves generally processed to be either 'V-shape (V)' or 'Depressed shape (凹)' and 'painted with black or dark brown color on grooves' to be different from the color of S-Layer, in order to show solidity by forming shadow line as well as to use the grooves as a jointing parts between each plywood at the time of installing WF-Material. (Wooden engineering, 1981).

Therefore, under the consideration of the said points, I, the applicant, 'putting into practical use both the Gas and Sound Sorbing Properties (hereunder referred to as GS-Sorbing Properties) of AC-Board or C-Board', invent the 'CW-Composites or ACW-Composites' as a BI-Material, that is, WF-Material or Surface Finishing Material (hereunder referred to as SF-Material), which contains 'H-GS-Sorbing-Room' where both gas adsorbing and sound absorbing actions can be simultaneously produced, moreover, 'the excellent quality of Gas and Sound Sorbing Efficiency (hereunder referred to as GS-Sorbing Efficiency) results from the structural shape'; such as 'H-GS-Sorbing-Room in the AC-Board or C-Board is wider than Lined Grooves on IS-Surface of S-Layer and joined to Lined Grooves on S-Layer, or adding to it, H-GS-Sorbing-Room can additionally take S-Reflecting Prism built up on the incident parts of Grooves of S-Layer' (Refer to T-3 of FIG. 6), and thus I herewith present "ACW-Composites of TFN-Veneer on AC-Board with W-Material or CW-Composites of TFN-Wood on C-Board with W-Material" and its "Manufacturing Method", composed of 'Gas and Sound Sorbing composite Structure (hereunder referred to as GS-Sorbing Structure or GS-Sorbing Com-Structure)', which must be able to provide inhabitants with the better health and the more comfortable environments through the multi-function of GS-Sorbing Action, when the CW-Composites or ACW-Composites can make it possible not only to do the highest qualified GS-Sorbing Function among all the methods introduced in the world by this time, but also to resolve matters of R-Gas which is able to be removed only by air ventilation at present, as well as to get rid of indoor polluted gas or stink such as TVOC, etc. besides, it can give the naturally beautiful looks by using natural wooden material carried with fancy design on S-Layer from the indoor view.

SUMMARY OF THE INVENTION

First, because AC-Board or C-Board itself has weak points for strength while it keeps Gas Adsorbing Ability (hereafter referred to as G-Adsorbing Ability), when it may be used for the WF-Material, it can be reinforced by the use of Wooden Material (below referred to as W-Material) as S-Layer or B-Layer such as N-Lumber, plywood, particle board, G-Laminated Wood, fiberboard, in order to make it easy to install, work and transport AC-Board or C-Board by resolving problems such as screw or nails driving work, boring work for electric wiring & pipe laying, cutting work, or bending work, etc. as well as to produce an excellent effects on beauty looks as the WF-Material, which will be caused 'by the use of FN-Lumber or the Fancy Veneer of Natural lumber overlaid on Wooden Material (below referred to as FN-Veneered W-Material) as the S-Layer of the CW-Composites or ACW-Composites' instead of the black and dark colored surface of AC-Board or C-Board.

Second, I would like to combine the Manufacturing Process to one lot ('One Step Process'), which was divided into 2 steps; the first step is to process AC-Board or C-Board and the second step is to stick both the B-Layer and S-Layer of W-Material to each side of AC-Board or C-Board with heat pressed process, which will give many advantages of energy saving efficiency, especially PMDI's no sticking to plates of charcoal making mold or pressing machine.

Third, I plan to improve the method under my Patent No 10-0572591, where I gave my consideration only to the adsorption of indoor gas quality, but not to the adsorption of R-Gas which came out of the inside wall of concrete itself or the outside ground of building with using general plywood without any air ventilation holes on B-Layer, however into the 'New Technology', where the shape of G-Adsorbing Structure on S-Layer will be changed from the setup of RB-Holes to that of Lined Grooves on S-layer of the Com-Structure, which must let the CW-Composites or ACW-Composites to take highly elevated strength, beautiful looks, easily manufacturing process, and excellently G-Absorbing Function because it can be sufficient to adsorb gases through air ventilating window with the Area directly Exposed to the Air (hereafter referred to as Air-E-Area) below 25% to the total surface of S-Layer or B-Layer, which was previously presented by me.

Fourth, if we want to promote the G-Adsorbing Ability, the own properties of AC-Board or C-Board as the C-Layer of CW-Composites or ACW-Composites, we can set up 'specified G-Adsorbing Structure on S-Layer or B-Layer of W-Material', 'in order to adsorb R-Gas entered from the wall and ground of concrete building itself into WS-Surface of C-Board or AC-Board in G-Adsorbing Structure, through RB-Holes on B-Layer, or Doubly Boring Holes (below referred to as DB-Holes) on B-Layer, or else H-GA-Room with Lined Grooves or H-DB-Holes in C-Layer which are joined and pierced to RB-Holes on the opposite side of the B-Layer, or through Round Boring Holes increasing the bored Area up to men's Waist from the Ground level of building (below referred to as RB-Holes increasing Area up to Waist from Ground)', and also simultaneously 'to adsorb Gases Harmful to human beings (below referred to as H-Gas) originated from indoor rooms of building into the IS-Surface of AC-Board or C-Board in G-Adsorbing Structure, through Lined Grooves on S-layer, or the Gas Adsorbing Room carried with the straight Line typed depressed Grooves (凹), which is Hidden, grooved up to a fixed depth in the Central Layer, and wider than straight Line typed depressed Grooves (|凵|) of the Surface Layer, and connected to the straight Line typed depressed Grooves of the Surface Layer (below referred to as H-GA-Room with Lined Grooves grooved up to a fixed depth in C-layer, wider than Lined Grooves of S-layer and connected to them)' (Please refer to FIG. 2), which can give beautiful looks with the natural beauty, solid volume and easy work in installation compared with RB-Holes on S-Layer.

Fifth, with my showing the high efficiency on acoustic absorptivity of AC-Board which contains micro fine void structures, I will not only present 'the highly G-Adsorbing Ability of the wider Hidden Room (hereafter referred to as H-Room) between S-Layer and C-Layer in the above said CW-Composites or ACW-Composites' which is linked and pierced to Lined Grooves of the S-Layer, but also I will disclose Sound Absorbing Ability (hereafter referred to as S-Absorbing Ability) of H-Room, hence I will clarify the said H-Room as 'the structure and function of H-GS-Sorbing Room' at the same time. Moreover, I will develop the advanced H-GS-Sorbing Room in the C-Layer of the ACW-Composites by building up 'S-Reflecting Prism on the sound-incident parts through Lined Grooves of S-layer at H-GS-Sorbing Room in the C-Layer of the ACW-Composites' (Please refer to T-3 of FIG. 6 and FIG. 8).

Therefore, 'CW-Composites of TFN-Wood on C-Board with W-Material or ACW-Composites of TFN-Veneer on AC-Board with W-Material', that is, the 'Com-Structure' manufactured according to the said solution, and its 'Manufacturing Method' must be able to provide inhabitants with the better health and the more comfortable living-environment through its multi-function of both gas and sound sorbing work, because they can certainly not only generate the highest qualified S-Absorbing Function among all the methods introduced in the world by this time, but also definitely solve the problem of R-Gas which can be removed only by air ventilation at present as well as surely get rid of polluted gases or stink such as TVOC, etc. in indoor room.

To satisfy the said subjects to resolve, above all, because C-Layer of AC-Board or C-Board itself is weak in impact or loads (AC-Board: 2.26 N/mm$^2$, White Charcoal Board (hereunder referred to as WC-Board: 4.15 N/mm$^2$, Please refer to Table 3), when used for a WF-Material, it can be reinforced by 12-24 N/mm$^2$ at Strength against Bending action (hereunder referred to as Bending Strength) shown on the Table 4 with the use of W-Material as S-Layer or B-Layer like N-Lumber, plywood, particle board, fiberboard, G-Laminated Timber, so as to make it easy to install, handle and transport AC-Board or C-Board, by resolving the problems on actual site work, for example, boring work for pipe laying or electric wiring, cutting work, screw driving work, or grooving work, as well as to have distinguished effects on beauty treatment as the WF- Material, which comes from the use of FN-Lumber or FN-Veneered W-Material instead of the black or dark colored surface of C-Board or AC-Board. (Please refer to FIGS. 1 and 5).

Second, I have manufactured the CW-Composites or ACW-Composites in accordance with my previous patents including Korean Patent No. 10-0572591 like following process; making AC-Board or C-Board as the first step, and adhering both the B-Layer and S-Layer of W-Material to AC-Board or C-Board as the C-Layer with heat pressed process as the second step. When PDMI Resin was used as a main adhesive in the process of the first step, products sometimes sticked to the plates of charcoal making mold or the plates of press machine even during the use of release agent or release film, which led to delaying the producing speed, rising economic loss, or giving some critical damages to the appearance and quality of products. Besides, if we pay attention to that the energy consumption was increased by 2 steps of the heating pressed process, 'One Step Process' combined from the said 2 steps of process must positively give the advantage of energy saving efficiency, particularly of highly qualified products manufacturing possibility because of PMDI Resin' no sticking to the plates of press machine or charcoal making mold. If I explain the 'One Step Process' in detail, after spreading PMDI Resin by 82 g/m² on the upper side of plywood with RB-Holes {on the surface of B-Layer faced to the Activated Charcoal Mat (below referred to as AC-Mat)}, placing the mat mixed the Activated Charcoal Powder (below referred to as AC-Powder) or C-Powder with putting PMDI Resin by 15% of all the dried weight of C-Powder or AC-Powder and {Ethylene Vinyl Acetate Emulsion Resin (hereunder referred to as EVA Resin or EVA): ph 5.5, 55% of resin in Non Volatile Content (below referred to as NVC)} by 5% of all the dried weight of C-Powder or AC-Powder, on which covering with S-Layer where spreading PMDI by 82 g/m² on the surface faced to AC-Mat, and I made products of the CW-Composites or ACW-Composites with 170° C. heating press by one step which was divided into '4 Stages of Hot Pressing Cycle' as shown on table 1; Pressing no more than 5 kg/cm² during 60 seconds so as to increase the heating temperature to S-Layer and B-Layer as the first stage, Pulling up the pressure up to 40 kg/cm² within 50 seconds and keeping 40 kg/cm² of pressure during 10 seconds at the second press-raising stage, Pressing by 10 kg/cm² during 120 seconds so as to remove the steam from C-Layer as the third stage, and at the last stage, Raising once more the press up to the 40 kg/cm² and maintaining the 40 kg/cm² of high pressure during 300 seconds while finished products was fixed to the final density during the adhesives' hardening process.

Third, I had insisted that the air ventilation holes should be 25% at least as the rate of RB-Holes' area to the whole area of S-Layer in my Patent No 10-0572591, and yet with the lapse of time, I detected that it was sufficient to adsorb the gas through air ventilation holes at the rate less than 25%, and that the more decreased was the Rate directly Exposed to the Air (hereafter referred to as Air-E-Rate) of AC-Board or C-Board, the better raised was the strength of the CW-Composites or ACW-Composites. Also as a shape of G-Adsorbing Structure on S-Layer indoors, 'Lined Grooves' type had more beautiful looks and easier manufacturing process than the RB-Holes' type. To tell the truth, 'air ventilation holes of Lined Grooves' type or RB-Holes' type on B-Layer appeared excellently G-Absorbing Function even at the conditions less than 25% ratio of AC-Board or C-Board exposed to the atmosphere', as it were, AC-Board even carried with Round Boring Holes formed (bored) by 1.5% ratio at least to all the surface area on the Back Layer (hereunder referred to as RB-Holes by 1.5% on B-Layer) not only reached the same G-Adsorbing Function in 6 hours later as the said Air-E-Rate of 25% like Table 1, but also took the advantage of reinforcing highly the strength of AC-Board on the other hand (Table 3), and the one with Boring Area formed (bored) by 5% ratio to all the surface area on the Back Layer (below referred to as B-Area by 5% on B-Layer) accomplished the same G-Adsorbing Function in 3 hours later as the one with Air-E-Rate of 100%. But when considering the reputation about boring shapes on the view of sight in the market, I will prefer 'Lined Grooves' type' to 'RB-Holes' type' on S-Layer, then of course, I will adopt RB-Holes' type on B-Layer. As S-Layer of the CW-Composites or CW-Composites, I will use 'Thin Fancy Veneer of Natural lumber (usually 0.2 mm-3 mm thick) overlaid on Wooden Material Board (hereunder referred to as TFN-Veneered WM-Board)' or will arrange 'Natural Lumber Panels (1-10 mm thick) (below referred to as NL-Panels)' at regular intervals and bind them to Wooden Material Board (below referred to as WM-Board). Consequently, on S-Layer of the TFN-Veneered WM-Board, I will not only process 'the straight Line typed depressed Grooves (凹) formed (grooved) by 1.5% ratio at least to all the surface area on the Surface Layer (below referred to as Lined Grooves by 1.5% on S-Layer), either as deep as the surface of C-Board or AC-Board, or deeper than that of AC-Board or C-Board up to half a depth', and 'showing naturally a three dimensional beauty by forming shadow lines' (Please refer to FIGS. 1 and 5) which will be formed from the original black color of AC-Board or C-Board (In the past, showing solidity by painting darker color, usually black than that of S-Layer on the plywood for the use of WF-Material (please refer to FIG. 6), but also will process 'H-GA-Room connected to Lined Grooves on S-Layer like FIG. 2 through Router Process to promote G-Absorbing Function as shown Table 1 by enlarging the Air-E-Area of AC-Board or C-Board' when making the Com-Structure of CW-Composites of TFN-Wood on C-Board with W-Material or ACW-Composites of TFN-Veneer on AC-Board with W-Material.

Fourth, though I applied normal plywood without any air ventilation holes to B-Layer in accordance with my previous Patent No 10-0572591, where I paid my attention only to adsorbing the indoor air quality, but not to adsorbing R-Gas permeated into rooms from the wall and ground of concrete building itself, I will set up the specified 'G-Adsorbing Structure on both S-Layer and B-Layer' to make the best use of the both sides of AC-Board or C-Board as a C-Layer of the 'One Step Processed CW-Composites of TFN-Wood on C-Board with W-Material' so as to give full swing to its G-Adsorbing Function and characteristics. If I explain B-Layer, I will use the CW-Composites or ACW-Composites as the R-Gas adsorbing and intercepting material by adsorbing R-Gas come out from the wall and ground of concrete building itself 'into the WS-Surface of the AC-Board or C-Board' and by turning to solid element after passing over H-Period (4 days, 96 hours) so as to be harmless to human beings, through 'Com-Structure of either RB-Holes or DB-Holes' (FIGS. 3-8) on B-Layer, or through 'H-GA-Room with Lined Grooves or H-DB-Holes in C-Layer connected and pierce to the RB-Holes' on the opposite side of B-Layer, or else through 'RB-Holes increasing Area up to Waist from Ground' on B-layer (Please refer to Table 5). And if mentioning S-Layer, I will simultaneously adopt the CW-Composites or ACW-Composites as the H-Gas adsorbing and intercepting material by adsorbing the indoor polluted H-Gas or stink like TVOC, etc. into 'the IS-Surface of C-Board or AC-Board in the C-Layer' through the specified Com-Structure such as 'S-layer with Lined Grooves like the below Practical Plan 1', or 'the one with Lined Grooves grooved from S-layer either up to the surface of C-layer or up to a fixed depth of C-Layer, C-Board or AC-Board' (Please refer to the first & second shape of structure from the top of FIG. 2), or else 'the Com-Structure of H-GA-Room with Lined Grooves in S-layer or C-layer which will be wider than Lined Grooves of S-layer and connected to them' through Router Process (Refer to the third and fourth shape of structure from the top of FIG. 2), accordingly, G-Adsorbing Ability will be promoted much highly.

Fifth, with the excellently G-Adsorbing Function as shown above, I will simultaneously demonstrate the GS-Sorbing Structure in the ACW-Composites of TFN-Wood on AC-Board with W-Material', which will be surely able to provide inhabitants with the more comfortable living environment than before now, by showing firstly that the 'S-Absorbing Ability of AC-Board must be much higher than that of W-lumber', and at the next time that the 'S-Absorbing Ability of the ACW-Composites of TFN-Wood on AC-Board with W-Material must be much more excellent than that of MDF with RB-Holes' (Please refer to M1 of FIG. 6), in other words, when processing Lined Grooves on S-Layer or C-Layer, I will establish one 'GS-Sorbing Com-Structure with GS-Sorbing Function which will be accompanied with Lined Grooves on C-Layer grooved up to half a depth (5 mm) of AC-Board with the width equal to Lined Grooves on S-Layer' like T-2 of FIG. 6, or another 'GS-Sorbing Com-Structure with GS-Sorbing Function which will have H-GS-Room with Lined Grooves in C-layer so as to be 3 times wider than Lined Grooves of S-Layer and connected to them' like T-4 of FIG. 6, or else a third GS-Sorbing Com-Structure with GS-Sorbing Function which will contain the S-Reflecting Prism built up on the incident parts through Grooves of S-Layer' to be promoted to T-3 from the structure T-4 of FIG. 6.

Advantageous Effects

This invention is about the 'G-Adsorbing Structure and its Manufacturing Method' which can produce to adsorb excellently gas into 'both sides of AC-Board or C-Board', the C-Layer in 'the ACW-Composites of TFN-Veneer on AC-Board with W-Material' or 'the CW-Composites of TFN-Wood on C-Board with W-Material', as it were, it can operate nicely as a device not only preventing human beings from being radiated with Radon radioactivity, by means of adsorbing the R-Gas originated from the concrete building itself or the ground beneath the building into the WS-Surface of AC-Board or C-Board of C-Layer through 'the Com-Structure of either RB-Holes or H-GA-Room linked with the RB-Holes on the opposite side of B-Layer in the CW-Composites or ACW-Composites', and at the successional step, R-Gas adsorbed in AC-Board or C-Board can be absolutely changed to the solid element harmless to human beings and fixed to AC-Board or C-Board after passing over H-Period (4 days, 96 hours, Please refer to Table 4), but also keeping human beings from being polluted with H-Gas, by means of adsorbing gases or stinks evaporated in the room such as formaldehyde, TVOC, etc. into the IS-Surface of AC-Board or C-Board of C-layer through 'the Com-Structure of either Lined Grooves on S-Layer or H-GA-Room of AC-Board or C-Board on S-Layer or C-Layer joined with Lined Grooves on S-Layer in the ACW-Composites or CW-Composites' (FIG. 2), Moreover, it can act as an equipment giving an excellent environments to human beings, by means of either building up 'the Com-Structure of GS-Sorbing Action which signifies H-GS-Sorbing-Room with Lined Grooves on C-layer wider than Lined Grooves on S-Layer and joined to them', or making up 'the Com-Structure of GS-Sorbing Function which signifies H-GS-Sorbing-Room carried with S-Reflecting Prism built up on the incident parts of Grooves on S-Layer' (Please refer to FIG. 6), thus we can justly meet 'the ACW-Composites of TFN-Wood on AC-Board with W-Material' or 'the CW-Composites of TFN-Wood on C-Board with W-Material' which is able to produce the most excellent GS-Sorbing Efficiency.

Therefore the said 'CW-Composites or ACW-Composites' will not only be able to be widely applied to school building, office building, concert hall, assembly hall, apartment, residential building or gymnasium as a SF-Material for the interior side of wall and ceiling of building as well as partition plates or parts of furniture, but also must be in the spotlight as a best human friendly and wellbeing material used for the Com-Structure of GS-Sorbing Function which will nicely provide inhabitants' health for air purified dwelling with the most comfortable environments, because it properly takes supreme strong points such as the natural beauty from N-Lumber, the cubic beauty from Lined Grooves, and the sufficient strength for easy and quick installing work or easy conveyance and manipulation.

BRIEF DESCRIPTION OF THE DRAWINGS

The above and other objects and advantages of the present invention will become more apparent by describing the preferred embodiment thereof in more detail with reference to the accompanying drawings in which.

DETAILED DESCRIPTION OF THE INVENTION

Practical Mode 1

1. The Optimum Processing Work of the Lined Grooves in the ACW-Composites of TFN-Veneer on AC-Board with W-Material.

Figure 1:
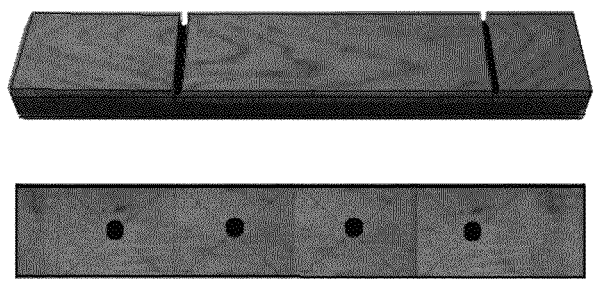
FIG. 1 is a picture of 'the CW-Composites or ACW-Composites' which was manufactured according to this invention; S-Layer 5 mm thick was made of FN-Veneer (White Oak Tree) overlaid on meranti (Lauan) plywood, C-Layer 10 mm thick was composed of AC-Board, and B-Layer 5 mm thick consists of meranti plywood. In detail, The above of FIG. 1 is the view of looking at a skew angle down on S-Layer of the ACW-Composites, which shows the processing work for Lined Grooves 3 mm wide per the interval 197 mm wide of S-Layer (Lined Grooves by 1.5% on S-Layer), and The below of the same Figure is the shape of vertically looking down on B-Layer of the ACW-Composites or CW-Composites, which represents the processing work for the RB-Holes 8.5 mm diametral on B-Layer made of Plywood 5 mm thick carried with Round Boring (Perforated) Holes, which is manufactured of 5 plies of Meranti (Lauan) laminated with Phenol Resin (hereunder referred to as Perforated & P-Resined 5 ply Meranti Plywood 5 mm thick) (RB-Holes by 1.5% on B-Layer).

Making the processing work of Lined Grooves at regular intervals on FN-Veneered Plywood composed of S-Layer in the CW-Composites or ACW-Composites like FIG. 1 (Please refer to statements below Table 1 about the manufacturing method). For example, if making a processing work of Lined Grooves 3 mm wide at every gap 197 mm wide on S-Layer, we can obtain Lined Grooves 3 mm wide per 200 mm of S-Layer which is just equivalent to the Air-E-Rate 1.5% to the total surface area of S-Layer in the CW-Composites or ACW-Composites.

As you see in Table 1, though there were a few differences of volume, when injecting Ethylene gas by 20~26 ppm, AC-Board adsorbed 91% of total gas within 1 hour in case of AC-Board exposed to the air by 100%, and AC-Board adsorbed the same volume of the total injected gas within 3 hours as the one of AC-Board with Air-E-Rate 100% when it was exposed to the air by 3~5% to the total surface area of S-Layer through Lined Grooves on S-Layer, and also I took the same results within 6 hours as the above said case of 100% at the time of AC-Board exposed to the air by 1.5% through Lined Grooves of S-Layer, besides, the G-Absorbing Volume of each case reached similar level after 24 hours later.

In Table 2, when injecting Xylene gas by 5000 μg/m$^3$ with high concentration, a kind of VOC which has been being regulated for air quality control, it took about 20 minutes for AC-Board to adsorb Xylene gas under the standards of air quality control regulation when AC-Board made the exposure to the air by 100%, and also it passed 40 minutes while AC-Board was exposed to the air by 25% through Lined Grooves on S-Layer, needed 50 minutes in case of 10%, 60 minutes in case of 5%, 3 hours in case of both 3% and 1.5%. Thus Xylene Gas Adsorbing Efficiency (below referred to as G-Adsorbing Efficiency) of AC-Board became decreased when the rate of the level exposed to the air getting lower, however, Xylene G-Adsorbing Volume of each case got to similar level after 24 hours later like Ethylene gas.

Figure 4:
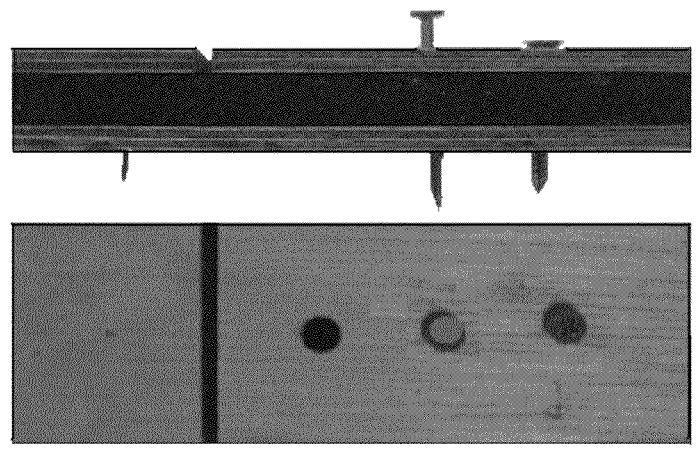
FIG. 4, as photos to display the actual processing and working efficiency of ACW-Composites under this invention, shows trial practices such as driving nails, making grooves, boring holes, driving screws, driving tackers, etc. under the conditions of reinforcing the weak points of AC-Board. The above shows cross sectional view of good conditions on works of driving tacks, nails, screws, grooving, and boring holes. The below shows the plane view.
Figure 5:
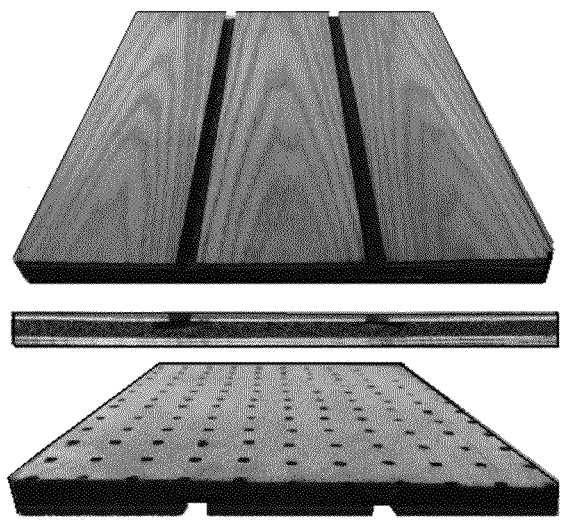
In FIG. 5, the above located shape is the front side (Indoor side) view of 'the ACW-Composites of Thin Fancy Natural Wood (TFN-Wood) on AC-Board with W-Material' carried with Lined Grooves ([¹¹]) grooved by 10% on Heat Treated Veneer of Ash Tree overlaid on Plywood (hereunder referred to as HT-Veneered Ash Tree on Plywood) as the S-Layer, and together accompanied with H-GA-Room in C-layer with Lined Grooves grooved from IS-Surface of C-Layer up to half a depth of C-layer which has the ground area 3 times wider than Lined Grooves of S-Layer and which is connected and pierced to Lined Grooves of S-Layer, on the other hands, the photo below is the back side (Wall side) view of the perforated plywood as a B-Layer of the ACW-Composites accompanied with RB-Holes bored from WS-Surface of B-Layer up to WS-Surface of C-Layer by 5% on B-Layer, and the photo middle is the cross sectional view of the ACW-Composites.

Because general plywood was made of crossed Wooden Veneers (hereunder referred to as W-Veneer) which had the high void structure, it physically showed the G-Adsorbing Function, still a little volume, however while the G-Adsorbing Volume of plywood become less and less at every new injection of the gas, AC-Board and C-Board continuously represented the same efficiency on G-Adsorbing Function as the previous practices at every new injection of the gas by 20-26 ppm at 4 times like Table 1. On the other side, in accordance with my reports in the year of 2010, I had repeatedly made experiments on the G-Adsorbing Efficiency of AC-Board or C-Board exposed to the air over 30 times for 6 years at laboratory, under the same conditions as Table 1, and as the result, I not only concluded that C-Board continued to fulfill the G-Adsorbing Function by 87.9% of initial function, likewise C-Board overlaid on W-Material did it by 72.9% of initial function, but also that G-Adsorbing Function must be kept on until C-Board would get saturated with the adsorbing gas to the maximum balance. Hence, when WC-Board was exposed to the air by 1.5%, it took the same effect in 3 hours as the results of when WC-Board was exposed to the air by 100%, however the G-Adsorbing speed of WC-Board was slower than that of AC-Board by a half volume of C-Board during 24 hours. Because of the properties that AC-Board had 2.26 N/mm$^2$ of the Bending Strength and WC-Board did 4.15 N/mm$^2$ as shown Table 3 which is similar to the one of IF-Board, it was hard to install them of themselves at actual site, but if reinforced with W-Material, the CW-Composites or ACW-Composites naturally held the much more increased Bending Strength as much as 12-24 N/mm$^2$ as shown Table 4, accordingly when it may be used for WF-Material or SF-Material, the CW-Composites or ACW-Composites can surely take a big merit for handling and transporting efficiency on such works as driving tackers, making grooves, boring holes, driving nails, driving screws, etc. like FIG. 4.

When processing Lined Grooves, we can make Lined Grooves either with a depth from S-Layer to the surface of AC-Board, C-Layer (The Top of FIG. 2) or with a depth from S-Layer to a little deeper spot beneath the surface of C-Board in the interior parts of C-Layer, for example, when forming Lined Grooves 3 mm wide per the surface of 200 mm wide on S-Layer we will obtain Air-E-Area by 1.5% to the total surface area of S-Layer in the CW-Composites or ACW-Composites, if making Lined Grooves from S-Layer up to 1 mm deeper spot than the IS-surface of C-Board 5 mm thick, or up to 3-5 mm deeper position than the IS-surface of C-Board 10 mm thick, we can get the more G-Adsorbing efficiency due to the increase of C-Board's surface area exposed to the air, as it were, that case (Grooves processed to 1 mm deeper point than the surface of C-Board 5 mm thick) can make wider the C-Board's surface area exposed to the air from 1.5% to 2.5%, and this case (Grooves processed to 3 mm deeper position than the surface of C-Board 10 mm thick) can extend Air-E-Rate to 4.5% instead of only 1.5% rate of Lined Grooves on S-Layer, and in case of Lined Grooves processed to 5 mm deeper position than the surface of C-Board 10 mm thick, the C-Board's Air-E-Rate can be enlarged from 1.5% to 6.5%, which signifies that the time to get to the same G-Adsorbing Efficiency as the condition exposed to the air by 100% can be reduced from 6 to 3 hours, in case of WC-Board, the time is sure to be fast from 3 to 1 hour in spite of small G-Absorbing Volume. In the same manner, as you see the practice of injecting highly concentrated Xylene, 5000 μg/m$^3$ in Table 2, if processing Lined Grooves from S-Layer to 5 mm deeper place than the surface of C-Board 10 mm thick, the total area exposed to the air will be extended from 1.5% to 6.5% and the time to get to the level below the standard of air quality control regulation can be shortened from 3 to 1 hour.

When Fancy Plywood (hereunder referred to as F-Plywood) are generally used for WF-Material, Lined Grooves are made as a shape of V-Type or 凹-Type and colors are painted with black or dark brown color different from those of S-Layer, which have effects on forming a kind of shadow line, displaying solid beauty and hiding the joining parts because parts of Lined Grooves are normally used as a joining parts when installing WF-Material as I introduced in the book 'Wooden Engineering' in 1981, incidentally compared with the said merits, because Lined Grooves are grooved at least to the surface of C-Board in the processing of the CW-Composites or ACW-Composites, it will be naturally able to show its own black color of C-Board without any other painting work, which will actually result in disclosing a kind of shadow line, displaying three dimensional beauty and hiding the joining parts as well as showing the G-Adsorbing Ability.

Therefore, if we consider the shown G-Adsorbing Ability during 6 to 24 hours, still under the condition of the just 1.5% area of the RB-Holes exposed to the air as a minimum area on B-layer in accordance with this applying invention, we can surely gain the almost same results as the 25% area of RB-Holes exposed to the air as a minimum area which was reported in my Korean Patent No 10-0572591 in the year of 2006, moreover, the CW-Composites or ACW-Composites takes pride in the excellently special features such as the possibility of increasing G-Adsorbing Ability with the better Gas Adsorbing Speed (below referred to as G-Adsorbing Speed) through the actual enlargement of the surface area exposed to gas by processing Lined Grooves up to a place a little deeper than the surface of C-Board though there are Lined Grooves only by 1.5% to S-layer different from RB-Holes' types of B-Layer, as well as the realization of both forming a kind of shadow line and showing three-dimensional beauty due to black color of C-Board itself, and simultaneously, the function of reinforcing the strength of C-Board.

TABLE 1

The variation of Ethylene Gas Adsorption of the WC-Board and AC-Board
Table 1-A: Ethylene Gas Adsorption of WC-Board per the Air-E-Rate at every passing time
(Unit: ppm/cm$^2$)

| Gas Injection | Passing Time | Plywood | 1.5%* | 3% | 5% | 10% | 25% | 100%* |
|---|---|---|---|---|---|---|---|---|
| Adsorption when first Injecting | 1 Hour | 0.49 | 4.29 | 4.28 | 5.85 | 5.29 | 5.59 | 5.41 |
| | 3 Hours | 1.17 | 8.75 | 9.73 | 10.90 | 9.66 | 9.74 | 8.05 |
| | 6 Hours | 1.20 | 12.42 | 13.59 | 14.58 | 12.93 | 12.83 | 10.60 |
| | 12 Hours | 0.65 | 16.53 | 17.55 | 18.12 | 16.36 | 15.81 | 14.13 |
| | 24 Hours | 1.76 | 20.41 | 20.36 | 21.07 | 18.99 | 18.55 | 16.87 |
| | 48 Hours | 3.08 | 22.90 | 21.75 | 22.92 | 20.99 | 20.60 | 19.16 |
| Adsorption when second Injecting | 1 Hour | 0.30 | 2.77 | 4.22 | 6.42 | 6.80 | 5.69 | 5.84 |
| | 24 Hours | 2.58 | 19.23 | 20.49 | 20.21 | 19.40 | 17.56 | 18.44 |
| | 48 Hours | 2.50 | 20.57 | 21.98 | 21.53 | 21.46 | 19.63 | 19.35 |
| Adsorption when third Injecting | 1 Hour | 0.43 | 4.85 | 6.73 | 9.33 | 4.27 | 4.21 | 4.94 |
| | 24 Hours | 1.90 | 18.74 | 20.40 | 21.39 | 19.68 | 17.68 | 17.50 |
| | 48 Hours | 1.86 | 22.35 | 22.36 | 23.05 | 22.09 | 21.80 | 19.77 |
| Adsorption when third Injecting | 1 Hour | 0.59 | 3.64 | 5.07 | 7.66 | 8.17 | 7.79 | 7.82 |
| | 24 Hours | 1.96 | 25.84 | 25.83 | 24.21 | 23.19 | 23.92 | 23.89 |
| | 48 Hours | 1.81 | 26.17 | 26.51 | 24.86 | 25.01 | 12.70 | 25.62 |

1) Above shown Table 1-A displays the variation of Ethylene Gas Adsorption of the WC-Board in the WCW-Composites per the ratio of area exposed to the air with the lapse of time (Unit: ppm/cm$^2$)—Please refer to Note.

2) The column 100%* signifies E-Area of WC-Board by 100%, that is, the Area of the White Charcoal Board Exposed to the air by 100% ratio to all the surface area of the White Charcoal Board.

TABLE 1-B

Ethylene Gas Adsorption of AC-Board per the Air-E-Rate at every passing time (Unit: ppm/cm$^2$)

| Gas Injection | Passing Time | Plywood | 1.5% | 3% | 5% | 10% | 25% | 100%* |
|---|---|---|---|---|---|---|---|---|
| Adsorption when first Injecting | 1 hour | 0.49 | 6.74 | 8.91 | 11.33 | 13.37 | 16.47 | 17.67 |
| | 3 hours | 1.17 | 18.00 | 18.21 | 20.50 | 21.53 | 22.18 | 18.29 |
| | 6 hours | 1.20 | 21.13 | 21.31 | 21.64 | 22.31 | 22.56 | 18.81 |
| | 12 hours | 0.65 | 22.95 | 22.86 | 22.08 | 22.76 | 22.87 | 19.01 |
| | 24 hours | 1.76 | 23.23 | 23.38 | 22.36 | 22.88 | 23.01 | 19.33 |
| | 48 hours | 3.08 | 23.54 | 23.75 | 22.56 | 23.12 | 23.32 | 19.46 |
| Adsorption when second Injecting | 1 hour | 0.30 | 7.44 | 9.09 | 11.03 | 13.34 | 16.34 | 16.90 |
| | 24 hours | 2.58 | 21.16 | 21.42 | 20.85 | 21.16 | 21.13 | 18.53 |
| | 48 hours | 2.50 | 21.36 | 21.48 | 21.06 | 21.05 | 22.48 | 19.51 |
| Adsorption when third Injecting | 1 hour | 0.43 | 6.79 | 8.43 | 11.02 | 13.69 | 16.78 | 17.47 |
| | 24 hours | 1.90 | 22.02 | 21.63 | 21.20 | 21.22 | 21.49 | 19.57 |
| | 48 hours | 1.86 | 22.77 | 22.17 | 22.49 | 22.51 | 22.40 | 20.14 |
| Adsorption when fourth Injecting | 1 hour | 0.59 | 7.13 | 10.01 | 11.56 | 12.73 | 15.78 | 18.46 |
| | 24 hours | 1.96 | 21.82 | 20.34 | 20.80 | 19.27 | 18.96 | 20.91 |
| | 48 hours | 1.81 | 22.54 | 20.45 | 21.64 | 19.81 | 19.30 | 23.04 |

1) Above shown Table 1-B appears the variation of Ethylene Gas Adsorption of the AC-Board in the CW-Composites per the ratio of area exposed to the air with the lapse of time (Unit: ppm/cm$^2$)—Please refer to Note.

2) The column 100%* signifies E-Area of AC-Board by 100%, as it were, the Area of the Activated Charcoal Board Exposed to the air by 100% ratio to all the surface area of the Activated Charcoal Board.

Note 1. Injecting Ethylene Gas by 20-26 ppm into a plastic container of 1000 ml which contained a WCW-Composites or ACW-Composites (50 cm$^2$ of total surface area), and measuring G-Adsorption as the time went by (average value of 2 times measuring). The C-Board of C-layer adsorbed the gas which flew into through the Lined Grooves processed of S-Layer made of plywood 5 mm deep overlaid on C-Board in the WCW-Composites or ACW-Composites. Making a flute 5×10 cm in area on the acrylic top plate of the case, into which putting the CW-Composites or ACW-Composites, sealing the connected parts of the CW-Composites or ACW-Composites with the lateral wall inside the acrylic case so as gas to be adsorbed only either through the Lined Grooves on the surface of plywood or through plywood of itself into C-Board beneath the plywood of S-layer. Ethylene G-Adsorption was measured by use of Gas Chromatograph (DC-14B, Manufacturer: Shimadzu).

Note 2. The Method manufacturing the White Charcoal-Wooden material Composites made of wooden material overlaid on white charcoal board laminated with wooden material (hereunder referred to as WCW-Composites): In the first place, spreading PMDI Resin by 82 g/m$^2$ on Perforated & P-Resined 5 ply-Meranti Plywood 5 mm thick. Next in the second place, making up and placing a mat on the said Plywood 5 mm thick with RB-Holes, which is made of the mixture of the White Charcoal Powder (below referred to as WC-Powder) produced from Oriental Oak [#6~12 (7%), #12~18 (14%), #18~40 (43%), #40~60 (23%), #60~100 (9%), below #100 (4%)] with PDMI resin by 15% of all the dried weight and EVA E-Resin {55% of resin NVC, ph 5.5} by 5% of all the dried weight. And in the third place, placing on the said White Charcoal Mat (hereunder referred to as WC-Mat) another P-Resined 5 ply-Meranti Plywood 5 mm thick, on joining parts of which spreading PMDI by 82 g/m$^2$ before setting it. In the fourth place, pressing the above three parts (Perforated & P-Resined 5 ply-Meranti Plywood 5 mm thick+WC-Mat of mixture+P-Resined 5 ply-Meranti Plywood 5 mm thick) with 'One Step Process' in the heat pressed machine at 170° C. according to the 4 stages' pressing schedule [1. Maintaining press contact during 60 seconds 2. Pressing up to 40 kg/cm$^2$ (Increasing pressure during 50 seconds, Keeping pressure during 10 seconds) 3. Pressing by 10 kg/cm$^2$ during 120 seconds 4. Pressing by 40 kg/cm$^2$ during 300 sec]

Note 3. The method manufacturing the ACW-Composites: In the first place, spreading Adhesive PMDI Resin by 82 g/m$^2$ on Perforated & P-Resined 5 ply-Meranti Plywood 5 mm thick with RB-Holes. In the second place, placing a AC-Mat on the said Plywood with RB-Holes, which is made of the mixture of AC-Powder produced from Coconut Shell [#6~12 (14.6%), #12~18 (31.68%), #18~40 (30.27%), #40~60 (12.35%), #60~100 (6.66%), below #100 (2.14%)] with PDMI resin by 15% of all the dried weight and EVA E-Resin by 5% of all the dried weight. In the third place, placing on the AC-Mat the other P-Resined 5 ply-Meranti Plywood 5 mm thick, on the linked parts of which spreading PMDI by 82 g/m$^2$ before setting it. And in the fourth place, pressing the above three parts at the same time (Perforated & P-Resined 5 ply-Meranti Plywood 5 mm thick+AC-Mat of mixture+P-Resined 5 ply-Meranti Plywood 5 mm thick) with 'One-Step-Process' in the heat pressed machine at 170° C. following 4 stages' pressing schedule [1. Maintaining press contact during 60 seconds during 60 seconds 2. Pressing up to 40 kg/cm$^2$ (Increasing pressure during 50 seconds, Keeping pressure during 10 seconds), 3. Pressing by 10 kg/cm$^2$ during 120 seconds, 4. Pressing by 40 kg/cm$^2$ during 300 seconds]

TABLE 2

The variation of Xylene Gas Adsorbing Efficiency by AC-Board Xylene Gas Adsorbing Efficiency of AC-Board per ratio of area exposed to the air at every passing time

| Passing Time | 100% | 25% | 10% | 5% | 3% | 1.5% |
| --- | --- | --- | --- | --- | --- | --- |
| 0 hour | 5451 | 6139 | 4876 | 4672 | 5227 | 5302 |
| 10 minutes | 1329 | 2003 | 2156 | 1922 | 2817 | 3045 |
| 20 minutes | 386 | 1081 | 1343 | 1470 | 2314 | 2222 |
| 30 minutes | 113 | 926 | 959 | 1065 | 1517 | 1755 |
| 40 minutes | 54 | 571 | 727 | 913 | 1614 | 1386 |
| 50 minutes | 13 | 427 | 550 | 781 | 1198 | 1394 |
| 60 minutes | 4 | 311 | 499 | 633 | 1098 | 1234 |
| 3 hours | 1 | 23 | 125 | 219 | 499 | 643 |
| 6 hours | 0 | 1 | 4 | 6 | 104 | 134 |
| 24 hours | 0 | 0 | 1 | 1 | 9 | 45 |

1) Above shown Table 2 presents the variation of Xylene Gas Adsorbing Efficiency of AC-Board in ACW-Composites per the ratio of area exposed to the air with the lapse of time (Unit: μg/m$^3$). Please refer to Note Note 1. Injecting Xylene Gas in a plastic container of 1000 ml which held the ACW-Composites (50 cm$^2$ of total surface area), and measuring G-Adsorption in process of time (average value after measuring 2 times) {Manufacturing Method same as Table 1, Measurement of Testing specimen: 5 W×10 L×1 H cm}. The C-Board of C-layer adsorbed the gas which flew into through the Lined Grooves on S-Layer of plywood 5 mm deep overlaid on C-Board in the ACW-Composites. Making a flute with the area of 5×10 cm on the acrylic top plate of the case, in which putting the ACW-Composites, and sealing the joined parts of the ACW-Composites with the lateral wall inside acrylic case so as gas to be adsorbed only through the Lined Grooves on the surface of plywood or thorough the plywood itself into C-Board beneath the plywood of S-Layer. Xylene Gas adsorbing volume was measured by use of VOC Analyzer (EGC-2, ABILIT Co.), and the value of Xylene Gas in Table 2 indicates residual concentrating volume after AC-Boards's adsorbing gas.

Note 2. The residual concentrating volume of Xylene Gas should be remained no more than 700 μg/m$^3$ in multiplex utilizable facilities including buildings in Korea according to Indoor Air quality Controlling Law, The Enforcement Regulation, Annex List Article 4.2 revised on Oct. 10, 2008.

Note 3. The residual concentrating volume of Xylene Gas should be less than 870 μg/m$^3$ at indoor room for Residential Building in Japan according to Guideline Value on Indoor Air Quality of VOC published in March, 2002 by Japanese Ministry of Welfare and Labor.

Practical Mode 2

2. The H-GA-Room in S-Layer or C-Layer linked to Lined Grooves of S-Layer in the CW-Composites or ACW-Composites If it needs the structure 'to get the higher speedy G-Adsorbing Efficiency' than that of Lined Grooves of S-Layer processed to the proper depth of C-Board or AC-Board as C-Layer like Practical Mode 1, there is a method to manufacture the H-GA-Room in S-layer or C-Layer, which is connected to Lined Grooves of S-Layer by the use of Router Process like the third structural shape from the top or the last one of FIG. 2. That is, if we set up Lined Grooves 3 mm wide plus the interval 197 mm wide on S-Layer, which is equal to the setting up of Lined Grooves 3 mm wide per the surface 200 mm wide on S-Layer, we can get the Air-E-Area of Lined Grooves by 1.5% to S-Layer of FN-Veneered Plywood under Practical Mode 1, and now providing that we grade up the above said structure, it is possible to process 'the Inner Gas Adsorbing Room (hereunder referred to as G-Adsorbing Room) which is hidden and placed either between the spot beneath the IS-Surface of S-Layer and the one on the WS-Surface of C-Layer in S-Layer, or between the place beneath the WS-Surface of S-Layer and the one beneath the IS-Surface of the C-Layer in C-Layer, joined to the Lined Grooves of S-Layer and larger than the width of Lined Grooves of S-Layer' by use of Router Process like the third structural shape from the top or the last of FIG. 2. And hence, as H-GA-Room can be expanded more than 30 mm wide which is 10 times wider than 3 mm, the width of Lined Grooves on the IS-Surface of S-Layer, we can obtain the much higher speedy G-Adsorbing Efficiency than the structure itself of Lined Grooves of S-Layer.

For example, if processed H-GA-Room with the dimension 30 mm wide and 5 mm more deeper than the IS-Surface of C-Board 10 mm thick (30 mm width×5 mm depth) based on Lined Grooves 3 mm wide of S-Layer, the width of C-Board or AC-Board's Air-E-Area surfaces reaches 40 mm (5+5+30=40 mm) in total (I herewith compare only the width between H-GA-Room and Lined Grooves of S-Layer because the said 2 structures have same length), and yet the Lined Grooves of S-Layer are remained with only 3 mm width because of those deep up to the surface of C-Board or AC-Board in C-layer. (Please refer to the bottom of FIG. 2). Hence the width of C-Board or AC-Board's Air-E-Area surface becomes 40 mm per 200 mm instead of 3 mm per 200 mm, as it were, 'the Air-E-Rate of C-Board or AC-Board is naturally equal to 20% (40/200)', which means that the time to get to the same G-Adsorbing Ability as the condition exposed to the air by 100% can be cut down from 6 hours under Air-E-Rate 1.5% up to 3 hours under Air-E-Rate 20% like Table 1. Likewise we can find out the results in table 2, that while Xylene gas indoors was adsorbed until the level below the safety standards the time was reduced from 3 hours under Air-E-Rate 1.5% up to 50 minutes under 20%.

Figure 2:
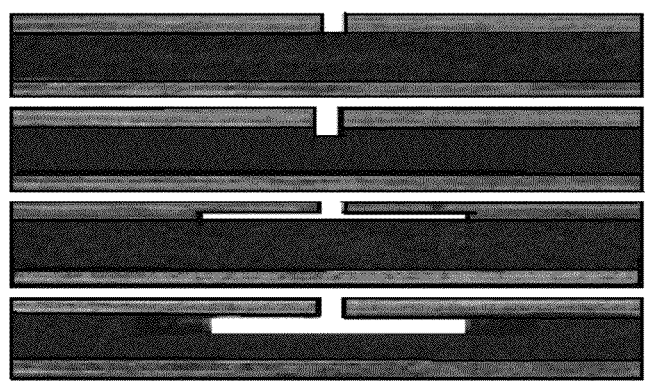
FIG. 2 is a cross sectional views of ACW-Composites so as to suggest the processing work for the Lined Grooves on S-layer or H-GA-Room in S-Layer or C-layer. If explaining definitely in FIG. 2, the first shape of structure from the top of FIG. 2 indicates the one of the Lined Grooves grooved from indoor side surface of S-layer up to indoor side surface of AC-Board by 1.5% on S-Layer, The second from the Top describes the looks of Lined Grooves grooved from the S-Layer up to the place 3 mm deep in AC-board of C-Layer by 1.5% on S-Layer, The third shows the Com-Structure contained Lined Grooves 3 mm deep and 3 mm wide and H-GA-Room with Lined Grooves the remained 2 mm deep and 30 mm wide in S-Layer 5 mm thick, which has the width of ground area up to 10 times wider than that of Lined Grooves of S-Layer, and which is coupled and pierced to Lined Grooves of S-Layer. The bottom of FIG. 2 presents the Com-Structure processed Lined Grooves 5 mm deep and 3 mm wide in S-Layer 5 mm thick and together H-GA-Room carried with Lined Grooves 5 mm deep and 30 mm wide in the interior parts of AC-Board, C-Layer 10 mm thick beneath S-Layer, which is coupled and pierced to Lined Grooves of S-Layer. Of course, the above mentioned H-GA-Room in C-Layer has the width of ground area up to 10 times wider than that of Lined Grooves of S-Layer.

By the way, because if the H-GA-Room is placed at C-Board or AC-Board in C-Layer, the strength of the CW-Composites or ACW-Composites may be diminished, we can make another choice by placing the H-GA-Room in the plywood of S-Layer like the third from the top of FIG. 2, which will lead to making an offer of the Air-E-Rate 15% (30/200) as well as the more elevated strength like Table 3. Besides, in this case, the WC-Board can reach the same efficiency within 1 hour as the conditions of Air-E-Rate 100%.

Practical Mode 3

3. The H-GA-Room and the Minimum Ratio of RB-Holes on B-Layer in the CW-Composites or ACW-Composites As you looked the above Practical Plan 1 & 2, I, the applicant, manufactured 'the ACW-Composites of TFN-Veneer on AC-Board with W-Material' or 'WCW-Composites of TFN-Veneer on WC-Board with W-Material' like FIG. 1, by organizing procedures such as not only processing Lined Grooves at the regular interval on the fancy S-Layer at IS-Surface of the 'ACW-Composites or WCW-Composites' and building up the H-GA-Room in C-Layer or S-Layer coupled to the said Lined Grooves through Router Process, but also processing RB-Holes to be 1.5% ratio at least on B-Layer 5 mm thick at WS-Surface of 'the ACW-Composites or WCW-Composites'. R-Gas which slips out of concrete wall itself and gaps or of the ground of buildings, can not only be adsorbed into the WS-Surface of C-Board or AC-Board during H-Period (4 days, 96 hours) through the RB-Holes on B-Layer of Plywood carried with Round Boring (Perforated) Holes (below referred to as Plywood with RB-Holes or Perforated Plywood), but also can be continuously changed to the solid element for the block of internal radiation exposure, accordingly, I am sure to say that we can make a use of the CW-Composites or ACW-Composites as a excellent Gas Adsorbing Material (hereunder referred to as G-Adsorbing Material) as well as gas blocking material (Please refer to Table 5).

In Table 5, as a result of examining the volume of both Radon (Rn 222) and daughter nuclide (Po 218) adsorbed and removed by charcoal and the activated charcoal under the examination practiced by Small Chamber Method so as to find out the solution to dilute and get rid of Radon and daughter nuclide, the case of using C-Board and AC-Board as a R-Gas blocking material had an excellent effect on reducing radon radioactivity as many as 72~85% more than the case of using only gypsum board did, and hence the volume of both Radon (Rn 222) and daughter nuclide (Po 218) was sufficiently dropped below 4 pCi/L, the standards of recommended volume during 96 hours a little more than H-Period. Besides, there was not any big difference between the activated charcoal 5 and 10 mm thick and though AC-Powder was a little more effective than AC-Board on holding up R-Gas, and still because AC-Board takes much more advantage of installing work on wall than AC-Powder, the use of board type is naturally recommended at actual site.

As a solution to allow C-Layer of C-Board or AC-Board to get the more speedy function on adsorbing R-Gas which entered from the concrete wall and gaps or the ground of buildings through RB-Holes by 1.5% as a minimum ratio on the B-Layer into the WS-Surface of C-Layer in 'the ACW-Composites or CW-Composites', if we increase RB-Holes by 10% at the area of section up to men's waist high from the ground level of building instead of 1.5% ratio at the same area, because R-Gas surely weigh more than general airs in the atmosphere, Gas Adsorbing Time (hereunder referred to as G-Adsorbing Time) will be necessarily reduced from 6 hours under the conditions of 1.5% to 3 hours under the conditions of 10% like Table 1, diminished from 3 hours at 1.5% to 50 minutes at 10% in case of xylene gas like Table 2 under the conditions to get the same G-Adsorbing Volume as Air-E-Rate 100%. For example, providing that the CW-Composites or ACW-Composites with measurement of 4 feet wide×8 feet long may be installed at a position 8 feet long (2400 mm) from ceiling to ground, we can make RB-Holes by 1.5% at the area of parts down to men's waist from the ceiling level of building (1500 mm) on B-Layer as well as can arrange RB-Holes by 10% at the area of place up to men's waist from the ground level of building (900 mm) on B-Layer.

With the above suggested solution, as another solution to give the more speedy function on adsorbing R-Gas into C-Layer, we can additionally set up H-DB-Holes at opposite side of RB-Holes on B-layer, which are perforated and pierced to the existing RB-Holes, larger in diameter than them, and as deep as the remained depth except the existing RB-Holes' depth on the WS-Surface of B-Layer, and so the said H-DB-Holes let the CW-Composites or ACW-Composites adsorb gases the more speedily as well as grow up the Bending Strength by decreasing RB-Holes' area at WS-Surface of B-Layer, as it were, we can make up another kind of H-GA-Room carried with H-DB-Holes on B-Layer. When making the H-DB-Holes on B-layer, we cannot adopt One-Step-Process, which should be naturally divided into 2 manufacturing processes; the one is the process manufacturing C-Board as C-Layer and the other is the process combining C-Board with S-Layer & B-Layer. As the first process manufacturing C-Board, making a mat from the mixture of either WC-Powder from Oriental Oak or AC-Powder from coconut shells whose sizes are equal to each of Note 2 & 3 of Table 1, which is mixed with PDMI by 15% of all the dried weight of WC-Powder or AC-Powder and EVA E-Resin by 5% of all the dried weight of it, and in succession of the first process, pressing the said mat in a heat pressed machine at 170° C. as the following 3 stages' pressing schedule [1. Pressing up to 40 kg/cm$^2$ (Raising up pressure during 50 seconds, Keeping pressure during 10 seconds), 2. Pressing by 10 kg/cm$^2$ during 120 seconds, 3. Pressing by 40 kg/cm$^2$ during 300 seconds] As the second process combining AC-Board or C-Board with S-Layer and B-Layer, for a start, placing WC-Board or AC-Board on the B-Layer spread PMDI by 82 g/m$^2$ after making H-DB-Holes on B-layer, on which covering the said mat with S-Layer spread PMDI by 82 g/m$^2$, and at the continued process, pressing the three parts together once more in a heat pressed machine at 170° C., by 10 kg/cm$^2$ during 150 seconds to complete the CW-Composites or ACW-Composites.

Figure 3:
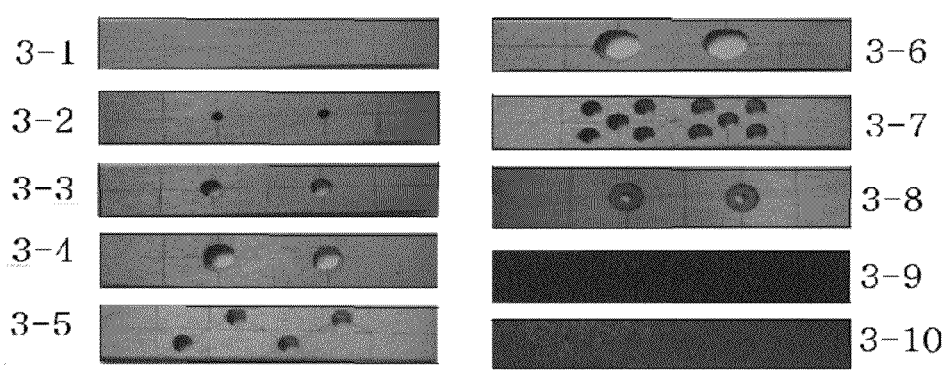
FIG. 3 is the collection of RB-Holes' shapes and numbers on the surface of B-Layer, which have an effect on Air-E-Rate of AC-Board or C-Board in the CW-Composites or ACW-Composites to examine B-Layer board's Bending Strength in conformity with the Ratio of Boring Area to the total surface area of B-Layer (hereunder referred to as B-Ratio or Boring Ratio) (Refer to Table 3). 3-1: No Perforating plywood without any RB-Holes bored & exposed to the air by 0%, 3-2: the plywood with 2 RB-Holes 5 mm in depth and 8.4 mm in diameter, bored & exposed to the air by 1.5% to the total surface area of B-layer (1.5% Boring Ratio), 3-3: the plywood with 2 RB-Holes 5 mm deep & 15.5 mm diametral, bored & exposed to the air by 5% to the total surface area of B-layer (5% Boring Ratio), 3-4: the plywood with 2 RB-Holes 5 mm in depth & 21.9 mm in diameter, bored & exposed to the air by 10% to the total surface area of B-layer (10% B-Ratio), 3-5: the plywood with 4 RB-Holes 5 mm in depth and 15.5 mm in diameter, bored & exposed to the air by 10% to the total surface area of B-layer (10% B-Ratio), 3-6: the plywood with 2 RB-Holes 5 mm deep and 34.6 mm in diameter, bored & exposed to the air by 25% to total surface area of B-layer (25% B-Ratio), 3-7: the plywood with 10 RB-Holes 5 mm in depth and 15.5 mm in diameter, bored & exposed to the air by 25% to the total surface area of B-layer (25% Boring Ratio), 3-8: the plywood with 2 DB-Holes, 3 mm deep and 8.4 mm in diameter, bored & exposed to the air by 1.5% to the total surface area on WS-Surface of B-Layer and together with 2 DB-Holes 2 mm in depth & 21.9 mm in diameter, bored & exposed to the air by 10% to the total surface area on IS-Surface of B-Layer, 3-9: WC-Board 10 mm thick, 3-10: AC-Board 10 mm thick.

For example, if we bore holes 3 mm deep and 8.4 mm diametral at WS-Surface of B-Layer 5 mm thick, and we doubly bore holes 2 mm deep and 21.9 mm in diameter which are perforated and pierced to the existing holes at IS-Surface of B-Layer 5 mm thick like column 8 of FIG. 3, we can obtain the Area Exposed to the air by 1.5% ratio to all the Surface area on the Back Layer (hereunder referred to as E-Area by 1.5% on B-Layer) at the WS-Surface of B-Layer, on the other hands, we can actually gain the Air-E-Rate 10% at the IS-Surface of B-Layer, which signifies the Area Exposed to the air by 10% ratio to all the surface area on the Back Layer (hereafter referred to as E-Area by 10% on B-Layer) in the view of total surface area of B-Layer. Moreover Bending Strength nearly reaches the conditions as high as that of 1.5% like Table 3, the needed passing time to adsorb gases as much as the volume of Air-E-Rate 100% can be advanced from 3 to 1 hour in case of WC-Board and from 6 to 3 hours in case of AC-Board, if we review the contents of Table 2, the time to drop below the standards can be shortened from 3 hours to 50 minutes.

Supposing that adsorbing R-Gas through B-Layer from wall side might be more important than H-Gas through S-Layer from indoor side, we can make 2 RB-Holes 5 mm deep and 8.4 mm diametral by 1.5% on B-Layer 5 mm thick, which will be linked either to the H-GA-Room with 2 RB-Holes 3 mm deep and 21.9 mm diametral by 10% in the C-Layer 10 mm thick of AC-Board & C-Board, or to the H-GA-Room with Line Grooves by 10% or more in C-Layer 10 mm thick of AC-Board and C-Board. If we choose H-GA-Room with 2 RB-Holes 3 mm deep and 21.9 mm in diameter by 10% in the C-Layer 10 mm thick of AC-Board & C-Board, the time to adsorb gases as much as the volume of the Area Exposed to the air by 100% ratio to all the surface area of Charcoal Board (hereunder referred to as E-Area by 100% of C-Board) could be 2 hours faster by changing from 3 to 1 hour in case of fine WC-Board, 3 hours faster from 6 to 3 hours in case of AC-Board, than that of Air-E-Area by 1.5% on B-Layer like Table 1, because the Gas Adsorbing Area (hereunder referred to as G-Adsorbing Area) of AC-Board actually climb to 15.5%, and also as shown on Table 2, though the Bending Strength might be fallen a little, it was proved that there was no a big difference statistically. Besides, if we select the H-GA-Room with Line Grooves 15 mm wide and 3 mm deep by 10% in the C-Layer 10 mm thick of AC-Board & C-Board which is coupled to 2 RB-Holes 5 mm deep and 8.4 mm diametral by 1.5% on B-Layer, the Air-E-Rate of H-GA-Room actually shows 14% which is calculated from 10% of the ground area of Lined Grooves plus 4% of the depth of them, and the H-GA-Room with Lined Grooves builds up a small passage from the ground level of building up to the ceiling height whose structure is different from H-GA-Room with 2 RB-Holes in C-Layer because that has the function ventilated separately by each RB-Hole, the other hands, this has the function ventilated by all in one passage of Lined Grooves.

As a matter of careful attention, if we set up the one H-GA-Room with Lined Grooves in C-Layer of AC-Board connected to RB-Holes on B-Layer to adsorb R-Gas from wall side, the other H-GA-Room with Lined Grooves in C-Layer of AC-Board connected to Lined Grooves on S-Layer to absorb gases from indoor side, should be located at different position from the one, in order one not to be filed on the another on the view of the ground plan. And also, in this case, the depth of the front H-GA-Room at IS-Surface should be adjusted to be 2 mm as well as that of the back H-GA-Room at WS-Surface to become 3 mm, because the summing up depth of 2 H-GA-Rooms should not be more than 50% ratio of total depth in AC-Board 10 mm deep for the purpose of maintaining the strength of the CW-Composites or ACW-Composites. Of course, either RB-Holes boring process or Lined Grooves grooving process on B-Layer can naturally be applicable to any kinds of B-Layer as the occasion demands.

TABLE 3

The Bending Strength per the ratio of RB-Holes' Area on plywood as the B-Layer in the CW-Composites or ACW-Composites

| Shape and ratio of RB-Holes on plywood, B-layer | Bending Strenght (MOR) (N/mm$^2$) ($F = 134.385$) -Note 3 | | MOE to B-Action (N/mm$^2$) ($F = 601.906$) -Note 3 | |
|---|---|---|---|---|
| | Ave ± SD | DUN | Ave ± SD | DUN |
| plywood without any RB-Holes bored by 0% -Note 1 | 58.87 ± 3.32 | E | 8317.67 ± 163.98 | I |
| plywood with 2 holes 5 mm deep 8.4 mm in diameter bored & exposed to the air by 1.5% -Note 2 | 54.40 ± 8.16 | E | 7957.00 ± 452.99 | I |
| plywood with 2 RB-Holes 3 mm deep 8.4 mm in diameter bored & exposed to the air by 1.5% on one side and with 2 DB-Holes 2 mm deep 21.9 mm in diameter bored & exposed to the air by 10% on the other side | 52.57 ± 0.42 | E | 6399.00 ± 4.58 | G |
| plywood with 2 RB-Holes 5 mm deep 15.5 mm in diameter bored & exposed to the air by 5% | 57.70 ± 1.65 | E | 7188.00 ± 94.57 | H |
| plywood with 2 RB-Holes 5 mm deep 21.9 mm in diameter bored & exposed to the air by 10% | 45.72 ± 6.71 | D | 6029.00 ± 237.29 | F |
| plywood with 4 RB-Holes 5 mm deep 15.5 mm in diameter bored & exposed to the air by 10% | 31.27 ± 4.75 | C | 5199.67 ± 332.78 | E |
| plywood with 2 RB-Holes 5 mm deep 34.6 mm in diameter bored & exposed to the air by 25% | 33.68 ± 0.78 | C | 4125.33 ± 91.09 | D |
| plywood with 10 RB-Holes 5 mm deep 15.5 mm in diameter bored & exposed to the air by 25% | 14.43 ± 0.97 | B | 1988.33 ± 239.32 | C |
| AC-Board 10 mm thick | 2.26 ± 0.27 | A | 559.33 ± 48.99 | A |
| WC-Board 10 mm thick | 4.15 ± 0.60 | A | 946.00 ± 313.59 | B |
| AC-Board 10 mm thick with 2 holes 3 mm deep and 21.9 mm in diameter | 2.38 ± 0.25 | A | 473.00 ± 5.00 | A |
| WC-Board 10 mm thick with 2 holes 3 mm deep and 21.9 mm in diameter | 2.59 ± 0.01 | A | 473.00 ± 5.00 | A |

Note 1. P-Resined 5 ply-Meranti (Lauan) Plywood 5 mm thick

Size of Testing Specimen: 50 wide×200 long×5 mm thick, Span: 50×150 mm

Note 2. Please refer to FIG. 3.

Symbol of % signified the ratio of area bored RB-Holes to total surface area of span.

Note 3. Duncan's new Multiple Range Test.

of F-Plywood 5 mm thick with Lined Grooves grooved by 1.5% to total surface area, B-Layer was made of Perforated & P-Resined 5 ply-Meranti (Lauan) Plywood 5 mm thick, which was carried with RB-Holes 5 mm deep bored by 1.5% to total surface area of B-layer except Plywood without holes, and C-Layer was made of AC-Board or WC-Board 10 mm thick with Lined Grooves or H-GA-Room as the needs arises.

TABLE 4

The Bending Strength of the CW-Composites or ACW-Composites which has the Com-Structures adsorbing gas through Both Sides (S-Layer & B-layer)

| ++Basic Composition of the WCW-Composites or ACW-Composites -Note 1<br>S-Layer (F-Plywood 5 mm thick) + C-Layer (C-Board 10 mm thick) +<br>B-Layer (Plywood 5 mm thick with RB-Holes 5 mm deep by 1.5%) | Bending Strength MOR<br>(N/mm$^2$) (Average ± SD) |
|---|---|
| ++Comparative (control) Composition 1 ++<br>* F-Plywood with no holes + AC-Board + Plywood with no holes | 25.60 ± 0.703 |
| * F-Plywood with Lined Grooves 5 mm deep & 3 mm wide grooved by 1.5% +<br>AC-Board +<br>Plywood with RB-Holes 5 mm deep bored by 1.5% | 23.98 ± 1.095 |
| * F-Plywood with Lined Grooves 5 mm<br>deep & 3 mm wide grooved by 1.5% +<br>AC-Board with Lined Grooves 3 mm deep<br>& 3 mm wide grooved by 1.5% +<br>Plywood with RB-Holes 5 mm deep bored by 1.5% | 19.35 ± 0.756 |
| * F-Plywood with Lined Grooves 5 mm<br>deep 3 mm & wide grooved by 1.5%<br>and with H-Room 2 mm deep & 30 mm wide in S-Layer of plywood +<br>AC-Board +<br>Plywood with RB-Holes 5 mm deep bored by 1.5% | 21.76 ± 1.972 |
| * F-Plywood with Lined Grooves 5 mm<br>deep & 3 mm wide grooved by 1.5% +<br>AC-Board with H-Room 5 mm deep<br>& 30 mm wide in C-Layer of C-Board +<br>Plywood with RB-Holes 5 mm deep bored by 1.5% | 16.2 ± 0.615 |
| ++Comparative (control) Composition 2 ++<br>* F-Plywood with no holes + WC-Board + Plywood with no holes | 20.91 ± 2.465 |
| * F-Plywood with Lined Grooves 5 mm<br>deep & 3 mm wide grooved by 1.5% +<br>WC-Board +<br>Plywood with RB-Holes 5 mm deep bored by 1.5% | 17.50 ± 0.870 |
| * F-Plywood with Lined Grooves 5 mm<br>deep & 3 mm wide grooved by 1.5% +<br>WC-Board with Lined Grooves 3 mm deep<br>& 3 mm wide grooved by 1.5% +<br>Plywood with RB-Holes 5 mm deep bored by 1.5% | 12.31 ± 2.418 |
| * F-Plywood with Lined -Grooves 5 mm<br>deep & 3 mm wide grooved by 1.5%<br>and with H-Room 2 mm deep<br>& 30 mm wide in back side of plywood S-Layer +<br>WC-Board +<br>Plywood with RB-Holes 5 mm deep bored by 1.5% | 12.52 ± 0.860 |

Note 1. The WCW-Composites or ACW-Composites consisted of S-Layer, C-Layer and B-Layer: S-Layer was made Note 2. The method manufacturing the WCW-Composites or ACW-Composites followed that of Table 1.

TABLE 5

Radon radioactivity Reducing Efficiency of C-Board and AC-Board
Unit: Measuring pCi/L after 96 hours

| Kinds of<br>Radon<br>radio-<br>activity | Gypsum<br>Board<br>(2 kg,<br>0.36 m$^2$) | CP -<br>Note 1<br>5 mm<br>deep | ACP -<br>Note 2<br>5 mm<br>deep | ACB -<br>Note 3<br>5 mm<br>deep | CP<br>10 mm<br>deep | ACP<br>10 mm<br>deep | ACB<br>10 mm<br>deep |
|---|---|---|---|---|---|---|---|
| Radon 222 | 13.97 | 3.86 | 2.59 | 2.43 | 2.32 | 2.08 | 2.46 |
| Po 218 | 0.3 | 0.19 | 0.18 | 0.12 | 0.11 | 0.14 | 0.11 |

Note 1. CP: Charcoal powder (hereunder referred to as C-Powder) 5 mm deep wrapping Gypsum Board in a small chamber of 0.027 m³

Note 2. ACP: AC-Powder 5 mm deep wrapping Gypsum Board in a small chamber of 0.027 cm³

Note 3. ACB: AC-Board 5 mm deep wrapping Gypsum Board in a small chamber of 0.027 cm³

Note 4. Chamber: Inner Cubic Meter: 0.027 m³ (0.3×0.3×0.3 m), made of acrylic plate 10 mm thick Note 5. Measuring & Analyzing Machine: SARAD EQF 3120

Practical Mode 4

4. GS-Sorbing Efficiency Variated According to the Shape and Structure of the ACW-Composites As I explained, 'the CW-Composites or ACW-Composites' were composed of 3 layers, that is, S-Layer, C-Layer and B-Layer; B-Layer was made of $E_0$ plywood 3 mm thick with RB-Holes 7.6 mm in diameter by 5% to B-Layer, through which could pass the R-Gas entered via concrete wall and cracks from the ground of building, and the R-Gas must have been eventually adsorbed into WS-Surface of AC-Board 10 mm thick, and having been changed to solid element after H-Period (4 days, 96 hours), and thus 'the CW-Composites or ACW-Composites' could be used during building life cycle. S-Layer visible from indoor side was normally made of FN-Lumber or FN-Veneered Plywood, actually in case of this plan, made of F-Veneered White Oak Tree on Plywood 3.4 mm thick. For the purpose of making a comparison with MDF-Board carried with RB-Holes 6 mm in diameter regularly bored by 10% to the total surface, which was generally used for S-Absorbing Material by that time in the market, I processed Lined Grooves (凵) grooved by 10% to the total surface area on the FN-Veneered Plywood as the S-Layer. Concerning C-Layer, because the AC-Board organizing C-Layer was a kind of porous material which had micro pore much more than general lumber and had the total summing up surface area over 1000 m²/g in average, the S-Absorbing Ability of AC-Board itself (M2 of FIG. 6) was much higher than that of natural lumber (Sabine, W. C. 1927) or plywood (Meyer, E 1931) as shown in Table 6 and FIG. 7. The above mentioned S-Absorbing Ability of AC-Board itself led the ACW-Composites to show the highly acoustic absorptivity beyond the ACW-Composites' G-Adsorbing Ability because it let sounds run through the Lined Grooves of S-Layer be absorbed easily with helps of works combined with Porous material type, Board Vibrating material type and Resonating material type which are just generated from structural shape of ACW-Composites or CW-Composites.

Figure 6:
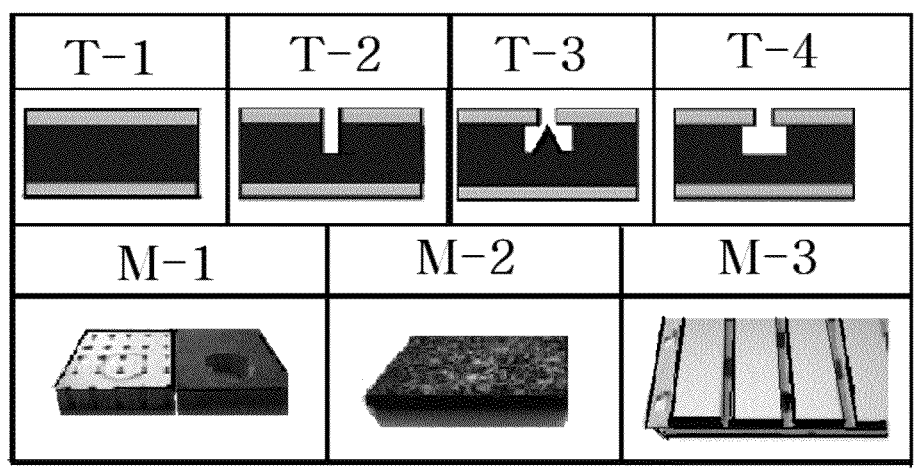
FIG. 6 indicates, as specimens for Impedence tube method, cross sectional views of each structural drawing to disclose and clarify the GS-Sorbing Structure of 'the ACW-Composites of TFN-Veneer on AC-Board with W-Material' for the purpose of measuring the Acoustic Absorptivities. because they are different in conformity with the structural shapes. Besides, M1 is, as the comparable control, a view of the opposite back side of MDF with RB-Holes perforated through all the board as the sound absorbing materials, which appears black from pasted paper. T-1: ACW-Composites 16.4 mm thick composed of Plywood 3.4 mm thick as a S-Layer+AC-Board 10 mm thick as a C-Layer+Plywood 3 mm thick as a B-Layer, T-2: ACW-Composites 16.4 mm thick composed of Plywood 3.4 mm thick with Lined Grooves 3.4 mm deep (grooved by 10%) as a S-Layer+AC-Board with Lined Grooves 5 mm deep as a C-Layer+Plywood 3 mm thick as a B-Layer, T-3: ACW-Composites 16.4 mm thick composed of Plywood 3.4 mm thick with Lined Grooves 3.4 mm deep (grooved by 10%) as a S-Layer+AC-Board with GS-Sorbing-H-Room which is 3 times wider than Lined Grooves of S-Layer together with S-Reflecting prism (Δ) as a C-Layer+Plywood 3 mm thick as a B-Layer, T-4: ACW-Composites 16.4 mm thick formed of Plywood 3.4 mm deep with Lined Grooves 3.4 mm in depth (grooved by 10%) as a S-Layer+AC-Board with GS-Sorbing-H-Room which is 3 times wider than the Lined Grooves of S-Layer as a C-Layer+Plywood 3.4 mm thick as a B-Layer, M1: MDF 16.6 mm thick with RB-Holes (10%) 16.6 mm deep, M2: AC-Board 10 mm thick, M3: Plywood 5 mm thick+MDF 10 mm thick. As you can see the structures in T-3 and T-4, GS-Sorbing-H-Room was manufactured by Router Processing Method, AC-Board of M-2 contains a great lot of minute and fine crevices in the interior parts, and M-3 is a kind of complex body which carries wooden panels overlaid at regular intervals on MDF board with RB-Holes perforated through all the board as the sound absorbing materials current in the market.
Figure 7:
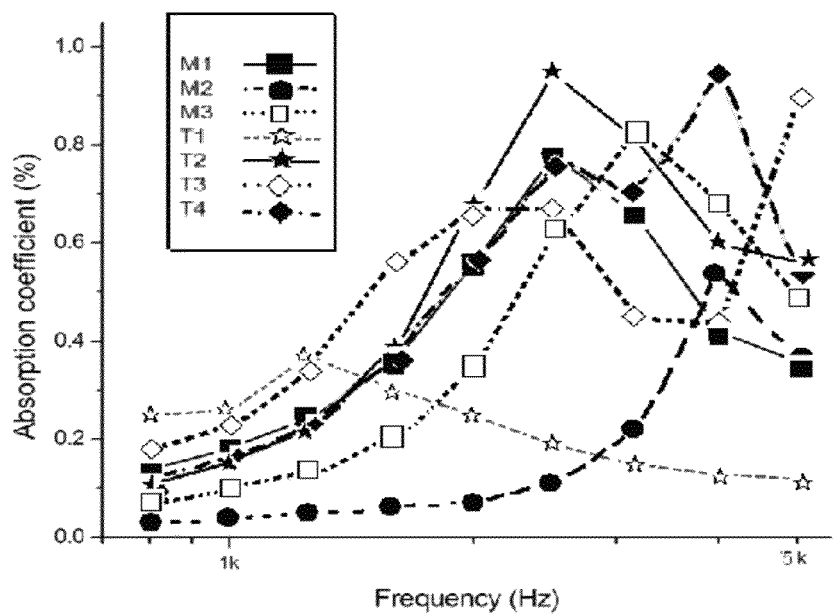
FIG. 7 is a graph shown the coefficient of acoustic absorptivity per frequency resulted from Table 6 which was measured after classifying each GS-Sorbing Com-Structure of the ACW-Composites of TFN-Veneer on AC-Board with W-Material. (M1, M2, M3, T1, T2, T3, T4)

M1 of FIG. 6 is the shape of MDF-Board 16.6 mm thick with perforated RB-Holes 16.6 mm deep and with black paper pasted on the back side of it as a S-Absorbing Material, and T2 of FIG. 6 indicates the ACW-Composites which consists of FN-Veneered Plywood with Lined Grooves formed by 10% to all the surface area (grooved from IS-surface up to WS-Surface of S-Layer) as the S-Layer, AC-Board with the Lined Grooves 5 mm deep (half a depth of AC-Board) and same wide as the Lined Grooves of S-Layer as the C-layer, and plywood with RB-Holes (perforated from IS-Surface up to WS-Surface of B-Layer) as the B-layer, if we compare M1 with T2, as seen in Table 6 and FIG. 7, T2 of FIG. 6 generally displays much higher acoustic absorptivity than M1, especially does remarkable gap between the cycle of 1.6 kHz to 5 kHz. And also T4 carried with the H-GS-Sorbing Room 3 times wider than the Lined Grooves of S-Layer, makes much higher efficiency than M1 on S-Absorbing Action between the high frequency cycle of 3.15 kHz to 5 kHz, too. Furthermore, T3 with H-GS-Sorbing Room which is added up with S-Reflecting Prism built up on the incident parts through Lined Grooves of S-Layer, distinguishes much more remarkable S-Absorbing Efficiency between the cycle of 800 kHz to 2 kHz than M1.

Figure 8:
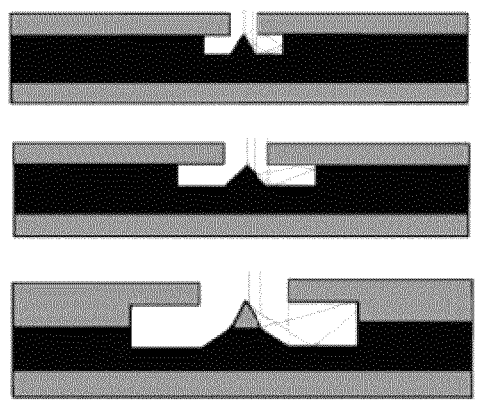
FIG. 8 is examples of the GS-Sorbing Com-Structure to have to manufacture various types according to the depth of S-Layer, C-Layer and B-Layer of the ACW-Composites of TFN-Veneer on AC-Board with W-Material. The S-Reflecting Prism (Δ) is built up on the incident parts through Lined Grooves of S-layer at H-GS-Sorbing Room in the C-Layer or S-Layer of the ACW-Composites.

To make matters better, as incident sounds are divided into being reflected or being absorbed by use of different structure and materials, the said S-Reflecting Prism (Δ) should be designed not only so as sounds to be reflected toward the inside of the H-GS-Sorbing-Room, but also the Com-Structure with it to manifest the highest efficiency on acoustic absorptivity by varying the applied features according the shape and thickness of the ACW-Composites. As practical examples, you can see several types of sounds to be absorbed and reflected in H-GS-Sorbing-Room on FIG. 8. Besides it is possible either to build up the above said S-Reflecting Prism (Δ) in the H-GS-Sorbing-Room on the existing Activated Charcoal Board directly Exposed to the Air (hereunder referred to as Air-E-AC-Board) or to build up simultaneously H-GS-Sorbing-Room together with the said S-Reflecting Prism (Δ) by moulding method at the time of heat pressing process on the ACW-Composites or CW-Composites. In conclusion, as I explained in the previous Practical Modes, because the CW-Composites or ACW-Composites takes the distinguished role on raising Sound Absorbing Efficiency (below referred to as S-Absorbing Efficiency) highly as well as making superior effects on G-Adsorbing Function (below referred to as G-Adsorbing Function) of C-Board or AC-Board according to processing various types of Lined Grooves in S-Layer & C-Layer, I dare to say that it is natural that the 'H-GA-Room' must be so named "Hidden Sound & Gas Sorbing Room (H-GS-Sorbing-Room)" and must be eventually positioned at a excellent rank as the GS-Sorbing Com-Structure of the CW-Composites or ACW-Composites, because it is naturally be able to give the more comfortable environments as well as the better health to residents in buildings.

TABLE 6

Acoustic Absorptivity at the H-GS-Sorbing Room of the ACW-Composites

| Shape of GS-Sorbing Structure per Frequency | 0.8 kHz | 1 kHz | 1.25 kHz | 1.6 kHz | 2 kHz | 2.5 kHz | 3.15 kHz | 4 kHz | 5 kHz |
|---|---|---|---|---|---|---|---|---|---|
| M1: MDF 16.6 mm thick with RB-Holes(10%) 16.6 mm deep | 0.14 | 0.18 | 0.24 | 0.36 | 0.56 | 0.78 | 0.66 | 0.42 | 0.36 |
| M2: The AC-Board 10 mm thick | 0.04 | 0.04 | 0.05 | 0.06 | 0.07 | 0.11 | 0.22 | 0.54 | 0.37 |
| M3: Plywood 5 mm thick + MDF 10 mm thick | 0.08 | 0.10 | 0.13 | 0.21 | 0.35 | 0.63 | 0.84 | 0.67 | 0.50 |
| T1: ACW-Composites 16.4 mm thick composed of Plywood 3.4 mm thick as a S-Layer + AC-Board 10 mm thick as a C-Layer + Plywood 3 mm thick as a B-Layer | 0.25 | 0.26 | 0.37 | 0.30 | 0.25 | 0.19 | 0.15 | 0.13 | 0.12 |

TABLE 6-continued

Acoustic Absorptivity at the H-GS-Sorbing Room of the ACW-Composites

| Shape of GS-Sorbing Structure per Frequency | 0.8 kHz | 1 kHz | 1.25 kHz | 1.6 kHz | 2 kHz | 2.5 kHz | 3.15 kHz | 4 kHz | 5 kHz |
|---|---|---|---|---|---|---|---|---|---|
| T2: ACW-Composites 16.4 mm thick composed of Plywood 3.4 mm thick with Lined Grooves (grooved by 10%) 3.4 mm deep + AC-Board with Lined Grooves 5 mm deep + Plywood 3 mm thick as a B-Layer | 0.11 | 0.15 | 0.22 | 0.39 | 0.68 | 0.95 | 0.82 | 0.60 | 0.56 |
| T3: ACW-Composites 16.4 mm thick composed of Plywood 3.4 mm thick with Lined Grooves (grooved by 10%) 3.4 mm deep + AC-Board with GS-Sorbing H-Room which is 3 times wider than Lined Grooves on S-Layer together with S-Reflecting prism (Δ) + Plywood 3 mm thick as a B-Layer | 0.17 | 0.23 | 0.35 | 0.56 | 0.67 | 0.67 | 0.45 | 0.44 | 0.90 |
| T4: ACW-Composites 16.4 mm thick composed of Plywood 3.4 mm deep with Lined Grooves (grooved by 10%) 3.4 mm deep + AC-Board with GS-Sorbing H-Room which is 3 times wider than Lined Grooves on S-Layer + Plywood 3.4 mm thick as a B-Layer | 0.12 | 0.15 | 0.23 | 0.39 | 0.56 | 0.77 | 0.70 | 0.94 | 0.53 |

Temperature at Measuring Time: Starting Temperature 23.2° C., Ending Temperature 23.5° C.

Humidity at Measuring Time: Starting Humidity 68%, Ending Humidity 67%.

* Measuring Equipment: Impedance Tube Method ISO 10534-2:1998(E).

Please refer to FIG. 6 for the shape and structure of M1, M3, T1, T2, T3, T4.

Note 1. The Method Manufacturing the ACW-Composites: The method manufacturing T1, T2, & T4 is same as that of Table 1. Regarding T3, making a body of ACW-Composites as a beginning step; first, making a mat from a mixture of AC-Powder pulverized from coconut shell into following sizes [#6~12 (14.6%), #12~18 (31.68%), #18~40 (30.27%), #40~60 (12.35%), #60~100 (6.66%), below #100 (2.14%)], which is compounded with PDMI Resin by 15% of all the dried weight and EVA E-Resin by 5% of all the dried weight, second, pressing the above said mat on a heat pressed machine at 170° C. according to 3 stage pressing schedule [1. Pressing up to 40 kg/cm$^2$ (Increasing pressure during 50 seconds, Keeping pressure during 10 seconds), 2. Pressing by 10 kg/cm$^2$ during 120 seconds, 3. Pressing by 40 kg/cm$^2$ during 300 seconds], and third, processing H-GS-Sorbing-Room together with the S-Reflecting Prism (Δ) on IS-Surface of Air-E-AC-Board in the above processed ACW-Composites, as a next step, placing the AC-Board 10 mm thick on the B-Layer (Perforated & Phenol Resined 3 ply Meranti (Lauan) E$_0$ Plywood 3 mm thick, with RB-Holes by 5%) spread Adhesive PMDI Resin by 82 g/m$^2$, and as a successional step, on which placing S-Layer (FN-Veneered White Oak Tree on Plywood 3.4 mm thick) spread PMDI Resin by 82 g/m$^2$, and as a final step, pressing all in one body of ACW-Composites in a heat pressed machine at 170° C., by 10 kg/cm$^2$ during 150 seconds, and finally processing Lined Grooves by 10% to S-Layer.

This invention tells its own tale to persons who have ordinary knowledge in this fields, moreover it is natural that the suggested Practical Plans to explain this invention are not limited only to a practical example.

The special features of invention is that CW-Composites of TFN-Wood on C-Board with W-Material or ACW-Composites of TFN-Veneer on AC-Board with W-Material is one of the excellent products which in the view of quality, not only has remarkably high GS-Sorbing-Function, but also takes advantages of making it easy and speedy to operate on installing, handling and transporting work at the actual site by reinforcing the strength of AC-Board or C-Board through building up a kind of Composites of wooden materials, moreover in the view of commercial value, it is able to present the three dimensional effects originated from processing Lined Grooves as well as the natural beauties come from making up S-layer of FN-Lumber or FN-Veneer.

Thus, the said 'CW-Composites or ACW-Composites' will not only must be in the spotlight as the best human friendly and wellbeing material used for the Com-Structure of GS-Sorbing Function which will naturally provide inhabitants' health for air purified dwelling with the most comfortable environments by absorbing noise as well as adsorbing H-Gas indoors and R-Gas from wall side into both the IS-Surface and WS-Surface of AC-Board or C-Board, but also will be able to be widely applied to office building, school building, concert hall, assembly hall, apartments, residential buildings or gymnasium, etc. as the superior SF-Material for the interior side of wall and ceiling of building as well as partition plates or parts of furniture, therefore, it will be a natural, proper and reasonable matters for 'CW-Composites or ACW-Composites' to be requested widely and be in high spotlight in the fields of industrial fields and commercial markets.

What is claimed is:

1. A charcoal-wooden material composite for both improving indoor air quality and removing radon gas comprising:
   a surface layer that is composed of thin fancy natural veneer overlaid on wooden material;
   a central layer that is composed of an activated charcoal board or a charcoal board; and
   a back layer that is composed of wooden material carried with round boring holes,
   wherein the round boring holes are formed through the wooden material of the back layer, and the surface layer has the straight line-typed depressed grooves over the overall length of the surface layer with the depth grooved from the indoor side surface of the surface layer up to the indoor side surface of the central layer,
   and further comprising a hidden gas and sound sorbing room in the central layer that is formed over the overall length of the central layer, is connected and pierced to said grooves on the surface layer, thereby to adsorb gases into both sides of the central layer, adsorb the gas of radon radioactivity which comes from the ground or the walls of a building itself into the wall side surface of the activated charcoal board or the charcoal board in the central layer through the round boring holes of the back layer, and at the same time adsorb gases harmful to human beings indoors into the indoor side surface of the activated charcoal board or the charcoal board in the central layer through the lined grooves of the surface layer.

2. The charcoal-wooden material composites according to claim 1, wherein the straight line type depressed grooves of the surface layer are grooved by 1.5% ratio at least to all the surface area of the surface layer.

3. The charcoal-wooden material composites according to claim 1, wherein the round boring holes on the back layer are bored from the wall side surface of the back layer either up to the wall side surface of the central layer, or up to the place 3 mm deep of all the depth of the central layer and formed by 1.5% ratio at least to the total surface area of the back layer.

4. The charcoal-wooden material composites according to claim 3, wherein the charcoal-wooden material composites have a hidden gas adsorbing room carried with the round boring holes on the back layer to be bored from the wall side surface up to a fixed depth of the back layer as much as 1.5% ratio at least to the total surface area of the back layer, and also carried together with doubly boring holes on the back layer to be bored from the indoor side surface down to the spot of the fixed depth (the remained depth) of the back layer as much as 10% ratio to all the surface area of the back layer, which is connected and perforated to round boring holes on the opposite side of the back layer.

5. The charcoal-wooden material composites according to claim 3, wherein the charcoal-wooden material composites have a hidden gas adsorbing room carried with the round boring holes perforated from one surface to the other side of the back layer by 1.5% to the back layer, and moreover carried together with the straight line-typed depressed grooves on the central layer to be grooved from the wall side surface down to the place 3 mm deep of the central layer as much as 10% ratio to the total surface area of the central layer, which is linked and pierced to the round boring holes of the back layer.

6. The charcoal-wooden material composites according to claim 3, wherein the charcoal-wooden material composites accompany the round boring holes on the wall side surface of the back layer to be bored in the area from the floor of the building itself up to a fixed height as much as 10% ratio to the total surface area of the back layer, and along with being bored in the remained (balanced) area from the said height up to the ceiling high as much as 1.5% ratio at least to the total surface area of the back layer.

7. The charcoal-wooden material composites according to claim 1, wherein the hidden gas and sound sorbing room is equipped with a sounds reflecting prism built up on incident parts to which sounds enters through the straight line-typed depressed grooves of the surface layer at the hidden gas and sound sorbing room which shall be placed at the parallel and counter position to the lined grooves of the surface layer.

8. The charcoal-wooden material composites according to claim 7, wherein the sounds reflecting prism has the shape of the prominent trigonal prism in the hidden gas and sound sorbing room, which furnishes high efficiency when fulfilling its specified function on acoustic absorptivity due to the shape and structure.

9. The charcoal-wooden material composites according to claim 1, wherein the hidden gas and sound sorbing room has the width wider than that of the lines grooves of the surface layer.

* * * * *